(12) United States Patent
Kusaka

(10) Patent No.: US 8,164,642 B2
(45) Date of Patent: Apr. 24, 2012

(54) IMAGE-CAPTURING DEVICE WITH A DESTRUCTIVE READ-TYPE IMAGE SENSOR

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 740 days.

(21) Appl. No.: 11/902,614

(22) Filed: Sep. 24, 2007

(65) Prior Publication Data

US 2008/0084483 A1    Apr. 10, 2008

(30) Foreign Application Priority Data

Sep. 28, 2006    (JP) ................................. 2006-264143

(51) Int. Cl.
   *H04N 5/228*    (2006.01)
(52) U.S. Cl. ..................... 348/222.1; 348/364; 396/111; 396/114
(58) Field of Classification Search .................. 348/364, 348/222.1; 396/111.114
   See application file for complete search history.

(56) References Cited

U.S. PATENT DOCUMENTS

| | | | |
|---|---|---|---|
| 5,235,428 A | 8/1993 | Hirota et al. | |
| 5,900,927 A * | 5/1999 | Hasegawa | 356/3.13 |
| 6,081,294 A * | 6/2000 | Cooper | 348/221.1 |
| 6,695,209 B1 * | 2/2004 | La | 235/462.2 |
| 6,819,360 B1 | 11/2004 | Ide et al. | |
| 6,906,751 B1 * | 6/2005 | Norita et al. | 348/349 |
| 2003/0122952 A1 * | 7/2003 | Kuroiwa | 348/333.11 |
| 2004/0169767 A1 * | 9/2004 | Norita et al. | 348/350 |

FOREIGN PATENT DOCUMENTS

| | | |
|---|---|---|
| EP | 1 085 751 A2 | 3/2001 |
| JP | A 62-294213 | 12/1987 |
| JP | A-2000-131596 | 5/2000 |
| JP | A 2000-258681 | 9/2000 |
| JP | A-2000-292686 | 10/2000 |
| JP | A 2001-069400 | 3/2001 |
| JP | A 2002-076317 | 3/2002 |
| JP | A-2003-140032 | 5/2003 |
| JP | A-2003-250080 | 9/2003 |

OTHER PUBLICATIONS

Mar. 29, 2011 Office Action issued in Japanese Application No. 2006-264143 (with translation).
Dec. 14, 2011 Search Report issued in EP Application No. 07117194.6.

* cited by examiner

*Primary Examiner* — Usman Khan
(74) *Attorney, Agent, or Firm* — Oliff & Berridge, PLC

(57) ABSTRACT

An image-capturing device includes: a destructive read-type image sensor that executes photoelectric conversion of a light flux from an optical system at a plurality of pixels, stores electrical charges resulting from the photoelectric conversion at the plurality of pixels, and outputs a signal corresponding to each of the stored electrical charges; a read unit that reads out the signal from the image sensor over a specific cycle; a display unit at which display is brought up based upon the signal read out by the read unit each time the read unit reads out the signal; a storage unit that individually stores signals read out by the read unit, each in correspondence to a read operation; an adding unit that adds up a plurality of signals obtained sequentially over time among the signals stored in the storage unit; and a focus detection unit that detects a focus adjustment state of the optical system based upon adding results provided by the adding unit.

16 Claims, 33 Drawing Sheets

201: digital still camera
202: exchangeable lens
203: camera body
204: mount unit
206: lens drive control device
207: aperture
208: zooming lens
209: lens
210: focusing lens
212: image sensor
213: electrical contact point portion
214: body drive control device
215: liquid crystal display element drive circuit
216: liquid crystal display element
217: eyepiece lens
219: memory card

| | | |
|---|---|---|
| 201: digital still camera | 208: zooming lens | 214: body drive control device |
| 202: exchangeable lens | 209: lens | 215: liquid crystal display element drive circuit |
| 203: camera body | 210: focusing lens | 216: liquid crystal display element |
| 204: mount unit | 212: image sensor | 217: eyepiece lens |
| 206: lens drive control device | 213: electrical contact point portion | 219: memory card |
| 207: aperture | | |

201: digital still camera
202: exchangeable lens
203: camera body
204: mount unit
206: lens drive control device
207: aperture
208: zooming lens
209: lens
210: focusing lens
211: image sensor
212: image sensor
213: electrical contact point portion
214: body drive control device
215: liquid crystal display element drive circuit
216: liquid crystal display element
217: eyepiece lens
219: memory card

IMAGE-CAPTURING DEVICE WITH A DESTRUCTIVE READ-TYPE IMAGE SENSOR

INCORPORATION BY REFERENCE

The disclosure of the following priority application is herein incorporated by reference:
Japanese Patent Application No. 2006-264143 filed Sep. 28, 2006

BACKGROUND OF THE INVENTION

1. Field of the Invention
The present invention relates to an image-capturing device.
2. Description of Related Art
There is an image-capturing device known in the related art that captures a subject image via an image sensor equipped with image-capturing pixels and focus detection pixels (see Japanese Laid Open Patent Publication No. 2002-076317).

SUMMARY OF THE INVENTION

There is an issue to be addressed in the image-capturing device in the related art described above in that it is difficult to assure both a successful refresh operation executed over a short cycle to provide optimal image display and successful focus detection for a subject with lower brightness, which is executed by using image signals from the focus detection pixels while displaying an image at a display device by using image signals from the image-capturing pixels.

According to the 1st aspect of the present invention, an image-capturing device, comprises: a destructive read-type image sensor that executes photoelectric conversion of a light flux from an optical system at a plurality of pixels, stores electrical charges resulting from the photoelectric conversion at the plurality of pixels, and outputs a signal corresponding to each of the stored electrical charges; a read unit that reads out the signal from the image sensor over a specific cycle; a display unit at which display is brought up based upon the signal read out by the read unit each time the read unit reads out the signal; a storage unit that individually stores signals read out by the read unit, each in correspondence to a read operation; an adding unit that adds up a plurality of signals obtained sequentially over time among the signals stored in the storage unit; and a focus detection unit that detects a focus adjustment state of the optical system based upon adding results provided by the adding unit.

According to the 2nd aspect of the present invention, in the image-capturing device according to the 1st aspect, it is preferred that the adding unit adjusts a number of signals to be added together so as to ensure that a signal level resulting from adding the signals exceeds a threshold value.

According to the 3rd aspect of the present invention, in the image-capturing device according to the 1st aspect, it is preferred that the signals stored in the storage unit are output from a specific pixel among the pixels constituting the image sensor.

According to the 4th aspect of the present invention, in the image-capturing device according to the 3rd aspect, it is preferred that the specific pixel includes a photoelectric conversion portion different from photoelectric conversion portions at pixels other than the specific pixel.

According to the 5th aspect of the present invention, in the image-capturing device according to the 3rd aspect, it is preferred that the specific pixel assumes spectral characteristics different from spectral characteristics of pixels other than the specific pixel.

According to the 6th aspect of the present invention, in the image-capturing device according to the 4th aspect, it is preferred that: the specific pixel is a focus detection pixel, based upon a signal from which a focus adjustment state of the optical system is detected; and the image sensor includes a plurality of focus detection pixels disposed in an array in correspondence to a focus detection area set within an image plane formed via the optical system and pixels other than the focus detection pixels are disposed around the array of the focus detection pixels.

According to the 7th aspect of the present invention, in the image-capturing device according to the 6th aspect, it is preferred that: the focus detection area is set at a plurality of positions within the image plane; the image sensor includes a pixel row constituted with a plurality of focus detection pixels set in correspondence to each of the plurality of focus detection areas; and the adding unit adds the signals individually in correspondence to each focus detection pixel row.

According to the 8th aspect of the present invention, in the image-capturing device according to the 6th aspect, it is preferred that the adding unit determines a number of signals from each focus detection pixel in the focus detection array to be added together in correspondence to signal levels at the other pixels disposed around the focus detection pixel array.

According to the 9th aspect of the present invention, in the image-capturing device according to the 4th aspect, it is preferred that the specific pixel at the image sensor receives light fluxes having passed through a pair of areas on an exit pupil of the optical system.

According to the 10th aspect of the present invention, in the image-capturing device according to the 1st aspect, it is preferred that there is further provided a control unit that executes control so as to store electrical charges at all the pixels in the image sensor over a uniform storage time.

According to the 11th aspect of the present invention, an image-capturing device, comprising: a destructive read-type image sensor that executes photoelectric conversion of a light flux from an optical system at a plurality of pixels, stores electrical charges resulting from the photoelectric conversion at the plurality of pixels, and outputs a signal corresponding to each of the stored electrical charges; a read unit that reads out the signal from the image sensor over a specific cycle; a display unit at which display is brought up based upon the signal read out by the read unit each time the read unit reads out the signal; a storage unit that individually stores signals read out by the read unit, each in correspondence to a read operation; an adding unit that adds up a plurality of signals obtained sequentially over time among the signals stored in the storage unit; and a focus detection unit that detects a focus adjustment state of the optical system based upon adding results provided by the adding unit. And: the signals stored in the storage unit are output from a specific pixel among the pixels constituting the image sensor; and the specific pixel includes a photoelectric conversion portion different from photoelectric conversion portions at pixels other than the specific pixel.

According to the 12th aspect of the present invention, an image-capturing device, comprises: a destructive read-type image sensor that executes photoelectric conversion of a light flux from an optical system at a plurality of pixels, stores electrical charges resulting from the photoelectric conversion at the plurality of pixels, and outputs a signal corresponding to each of the stored electrical charges; a read unit that reads out the signal from the image sensor over a specific cycle; a display unit at which display is brought up based upon the signal read out by the read unit each time the read unit reads out the signal; a storage unit that individually stores signals read out by the read unit, each in correspondence to a read operation; an adding unit that adds up a plurality of signals obtained sequentially over time among the signals stored in the storage unit; and a focus detection unit that detects a focus adjustment state of the optical system based upon adding results provided by the adding unit. And: the signals stored in the storage unit are output from a specific pixel among the pixels constituting the image sensor; the specific pixel is a focus detection pixel based upon a signal from which focus adjustment state of the optical system is detected; and the image sensor includes a plurality of focus detection pixels disposed in an array in correspondence to a focus detection area set within an image plane formed via the optical system and pixels other than the focus detection pixels are disposed around the array of the focus detection pixels.

According to the 13th aspect of the present invention, an image-capturing device, comprises: a destructive read-type image sensor that executes photoelectric conversion of a light flux from an optical system at a plurality of pixels, stores electrical charges resulting from the photoelectric conversion at the plurality of pixels, and outputs a signal corresponding to each of the stored electrical charges; a read unit that reads out the signal from the image sensor over a specific cycle; a display unit at which display is brought up based upon the signal read out by the read unit each time the read unit reads out the signal; a storage unit that individually stores signals read out by the read unit, each in correspondence to a read operation; an adding unit that adds up a plurality of signals obtained sequentially over time among the signals stored in the storage unit; and a focus detection unit that detects a focus adjustment state of the optical system based upon adding results provided by the adding unit. And: the signals stored in the storage unit are output from a specific pixel among the pixels constituting the image sensor; the specific pixel is a focus detection pixel, based upon a signal from which the focus adjustment state of the optical system is detected; the image sensor includes a plurality of focus detection pixels disposed in an array in correspondence to a focus detection area set within an image plane formed via the optical system and pixels other than the focus detection pixels are disposed around the array of the focus detection pixels; the focus detection area is set at a plurality of positions within the image plane; the image sensor includes a pixel row constituted with a plurality of focus detection pixels, set in correspondence to each of the plurality of focus detection areas; and the adding unit adds the signals individually in correspondence to each focus detection pixel row.

According to the 14th aspect of the present invention, an image-capturing device, comprises: a destructive read-type image sensor that executes photoelectric conversion of a light flux from an optical system at a plurality of pixels, stores electrical charges resulting from the photoelectric conversion at the plurality of pixels, and outputs a signal corresponding to each of the stored electrical charges; a read unit that reads out the signal from the image sensor over a specific cycle; a display unit at which display is brought up based upon the signal read out by the read unit each time the read unit reads out the signal; a storage unit that individually stores signals read out by the read unit, each in correspondence to a read operation; an adding unit that adds up a plurality of signals obtained sequentially over time among the signals stored in the storage unit; and a focus detection unit that detects a focus adjustment state of the optical system based upon adding results provided by the adding unit. And: the signals stored in the storage unit are output from a specific pixel among the pixels constituting the image sensor; and the specific pixel at the image sensor receives light fluxes having passed through a pair of areas on an exit pupil of the optical system.

BRIEF DESCRIPTION OF PREFERRED EMBODIMENTS

Figure 1:
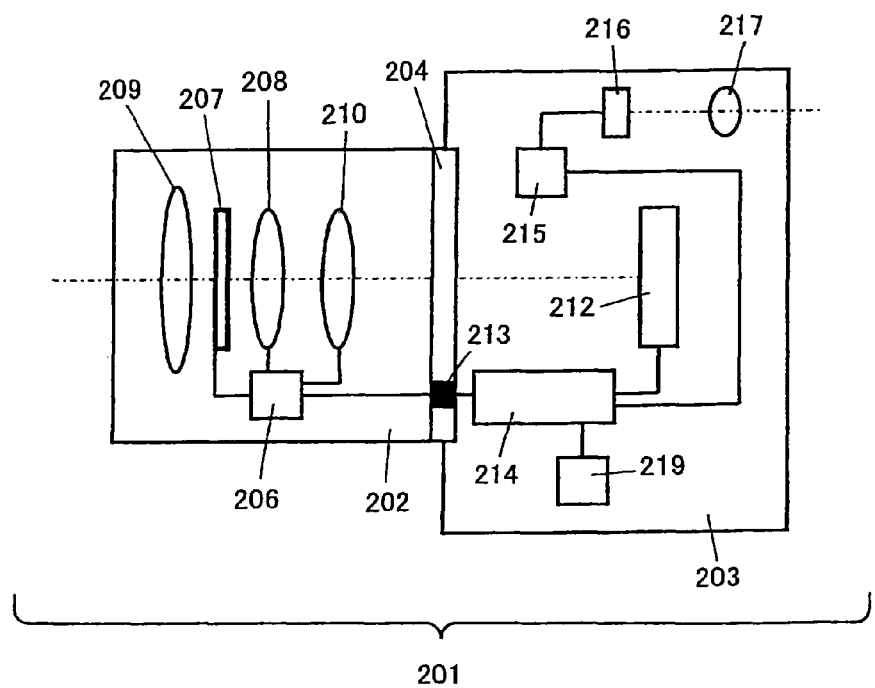
FIG. 1 shows the structure adopted in an embodiment.

A digital still camera achieved in an embodiment by adopting the image-capturing device according to the present invention is now explained. FIG. 1 shows the structure adopted in the embodiment. A digital still camera 201 achieved in the embodiment comprises an exchangeable lens 202 and a camera body 203. The exchangeable lens 202 is mounted at the camera body 203 via a mount unit 204.

The exchangeable lens 202 includes a lens drive control device 206, a zooming lens 208, a lens 209, a focusing lens 210, aperture 207, and the like. The lens drive control device 206, which includes a microcomputer and peripheral components such as a memory, controls the drive of the focusing lens 210 and the aperture 207, detects the states of the zooming lens 208 and the focusing lens 210 and transmits lens information to a body dive control device 214 to be detailed later, receives camera information from the body drive control device 214 and the like.

An image sensor 212, the body drive control device 214, a liquid crystal display element drive circuit 215, a liquid crystal display element 216, an eyepiece lens 217, a memory card 219 and the like are disposed at the camera body 203. Pixels to be detailed later are two-dimensionally arrayed at the image sensor 212, which is disposed at an predetermined imaging plane of the exchangeable lens 202 to capture a subject image formed through the exchangeable lens 202. It is to be noted that focus detection pixels arrayed at a specific focus detection position at the image sensor 212, are to be described in detail later.

The body drive control device 214, constituted with a microcomputer and peripheral components such as a memory, controls image signal read from the image sensor 212, image signal correction, detection of the focus adjustment state at the exchangeable lens 202, and reception of lens information from the lens drive control device 206 and transmission of camera information (defocus amount) to the lens drive control device 206, as well as the overall operations of the digital still camera. The body drive control device 214 and the lens drive control device 206 engage in communication with each other via an electrical contact point portion 213 at the mount unit 204 to exchange various types of information.

The liquid crystal display element drive circuit 215 drives the liquid crystal display element 216 at a liquid crystal viewfinder (EVF: electrical viewfinder). The photographer is able to observe an image displayed at the liquid crystal display element 216 via the eyepiece lens 217. The memory card 219 can be loaded into/unloaded from the camera body 203 freely and is a portable storage medium for storing image data.

Light from the subject having passed through the exchangeable lens 202 and formed as a subject image on the image sensor 212 undergoes photoelectric conversion at the image sensor 212 and the photoelectric conversion output is then provided to the body drive control device 214. The body drive control device 214 calculates the defocus amount indicating the extent of defocusing manifesting at a specific focus detection position based upon the data output from the focus detection pixels disposed on the image sensor 212 and transmits this defocus amount to the lens drive control device 206. In addition, the body drive control device 214 stores image signals generated based upon the output from the image sensor 212 into the memory card 219 and provides the image signals to the liquid crystal display element drive circuit 215 to enable the liquid crystal display element 216 to display the image.

Operation members (e.g., a shutter button, a focus detection position setting member and the like, not shown) are disposed at the camera body 203. The body drive control device 214 detects operation state signals from these operation members and controls operations (image-capturing operation, focus detection position setting operation, image processing operation) based upon the detection results.

The lens drive control device 206 adjusts the lens information in correspondence to the current focusing state, zooming state and aperture setting state, the aperture F value and the like. More specifically, the lens drive control device 206 monitors the positions of the lenses 208 and 210 and the setting at the aperture 207, and calculates lens information based upon the monitored information. Alternatively, it may select the lens information corresponding to the monitored information from a lookup table prepared in advance. In addition, the lens drive control device 206 calculates a lens drive quantity indicating the extent to which the lens is to be driven based upon the defocus amount having been received and drives the focusing lens 210 to a focusing point based upon the lens drive quantity via a drive source such as motor (not shown).

Figure 2:
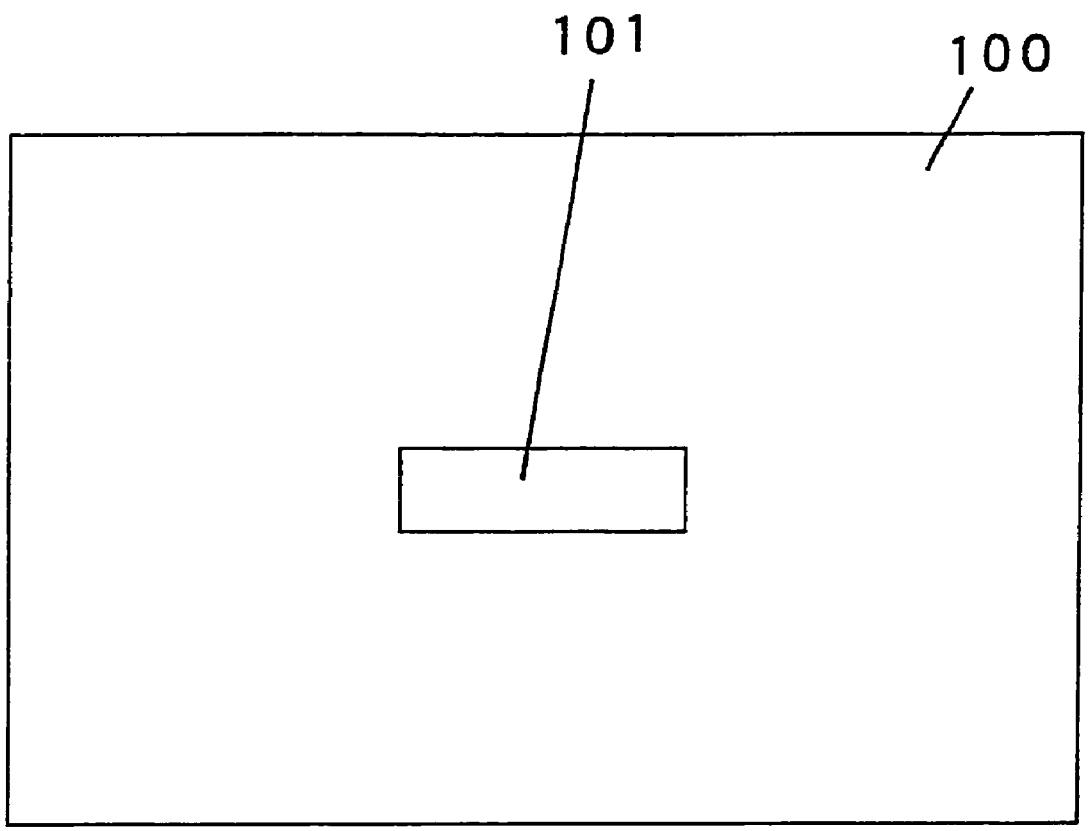
FIG. 2 indicates a focus detection position set on the photographic image plane in the embodiment.

FIG. 2 shows the focus detection position set on the photographic image plane in the embodiment, i.e., the area (focus detection area) where the subject image is sampled on the photographic image plane to detect the focus on a focus detection pixel row to be detailed later. In the embodiment, a focus detection area 101 is set at the center of a photographic image plane 100. Focus detection pixels are arrayed linearly along the longer side of the focus detection area 101 assuming a rectangular shape.

Figure 3:
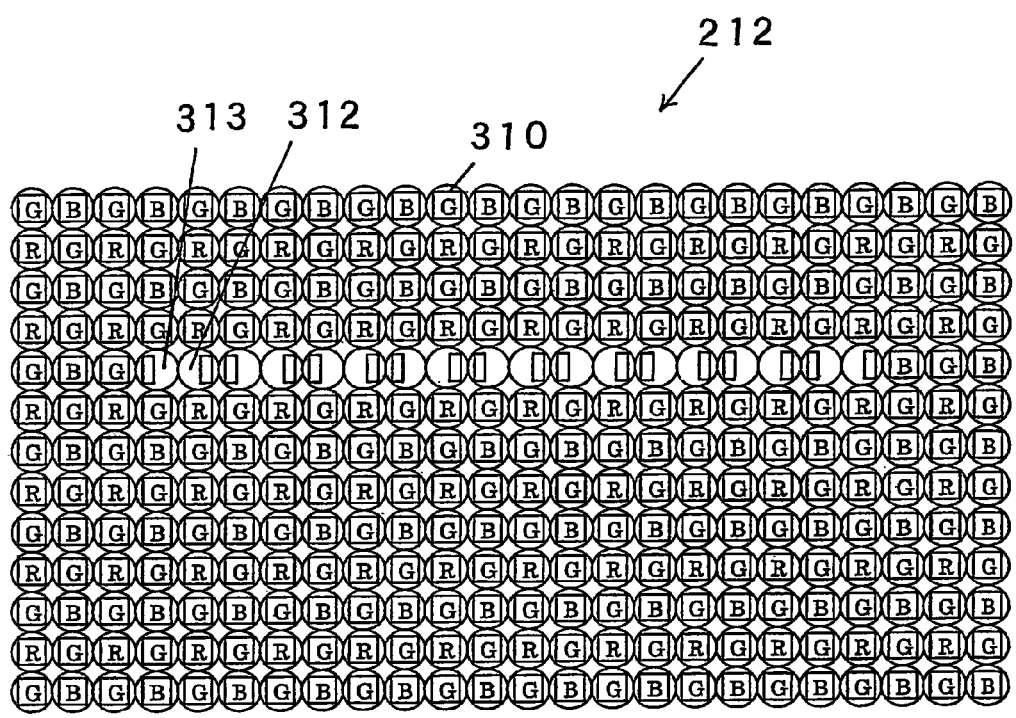
FIG. 3 shows in detail the structure adopted in the image sensor in the embodiment.

FIG. 3 is a front view showing in detail the structure adopted in the image sensor 212, in an enlargement of the vicinity of the focus detection area 101 on the image sensor 212. The lengthwise direction and the widthwise direction (the directions along which the pixel rows and the pixel columns respectively extend) assumed in the figure corresponds to the lengthwise range and the widthwise range of the photographic image plane 100 in FIG. 2. The image sensor 212 comprises image-capturing pixels 310 engaged in image-capturing operation and focus detection pixels 312 and 313 engaged in focus detection, with the focus detection pixels 312 and 313 alternately disposed along the horizontal direction in the focus detection area 101. The focus detection pixels 312 and 313 are disposed in a straight line in a row where G color image-capturing pixel 310 and a B color image-capturing pixel 310 would be disposed.

Figure 4:
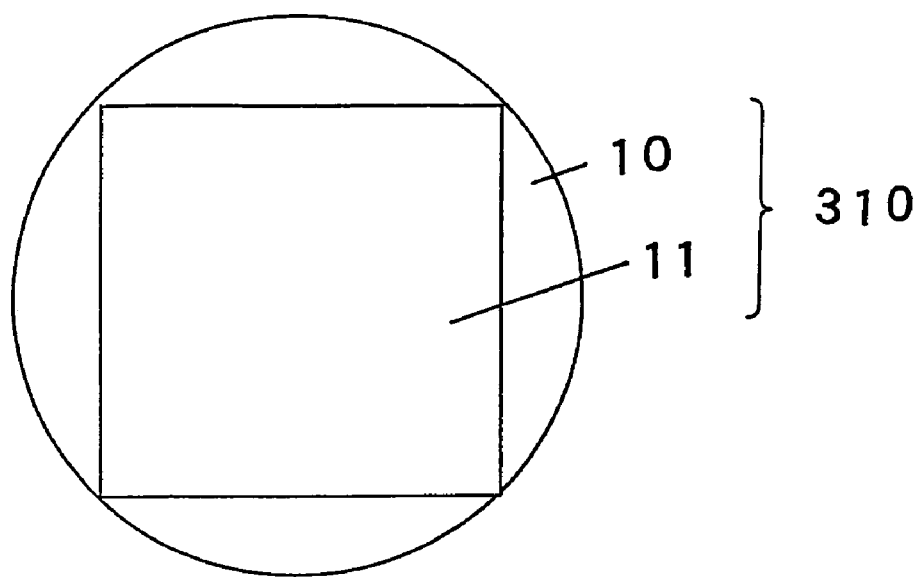
FIG. 4 shows the structure of the image-capturing pixels.
Figure 6:
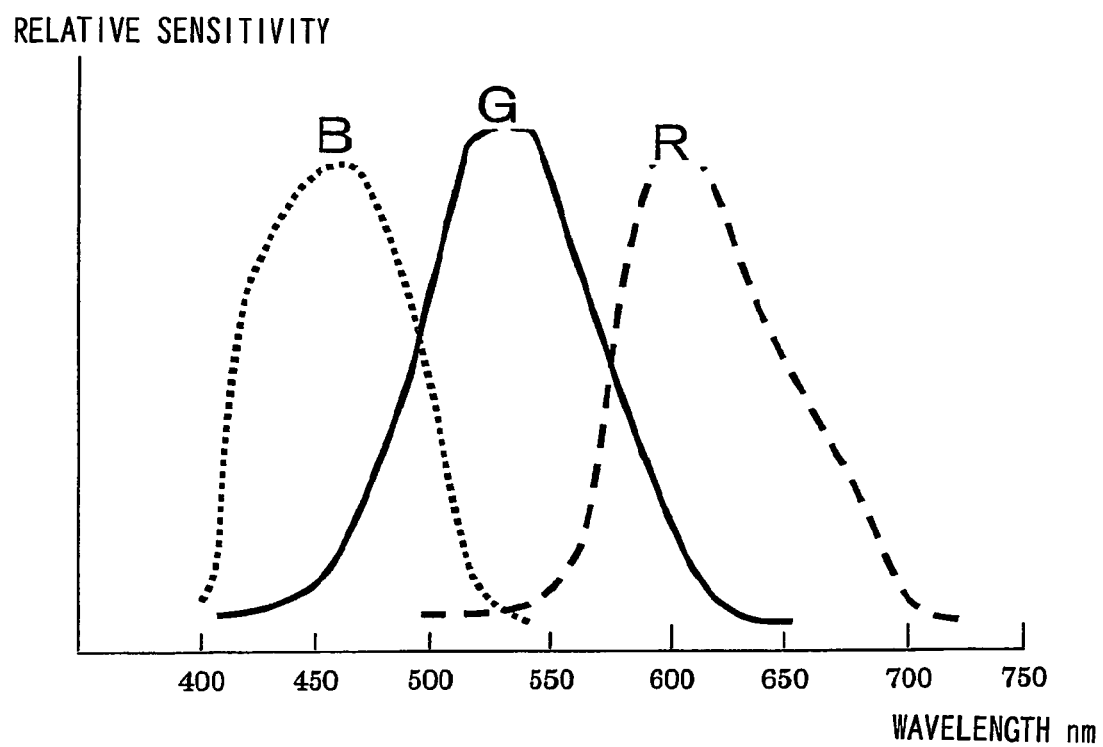
FIG. 6 shows the spectral sensitivity characteristics of green, red and blue image-capturing pixels.

As shown in FIG. 4, the image-capturing pixels 310 each include a micro-lens 10, a photoelectric conversion portion 11 and a color filter (not shown). The color filters at the individual image-capturing pixels each assume one of the three colors, red (R), green (G) or blue (B) and the red, green and blue color filters assume spectral sensitivity characteristics shown in FIG. 6. The image-capturing pixels 310 equipped with such color filters are arranged in a Bayer array at the image sensor 212.

Figure 5A:
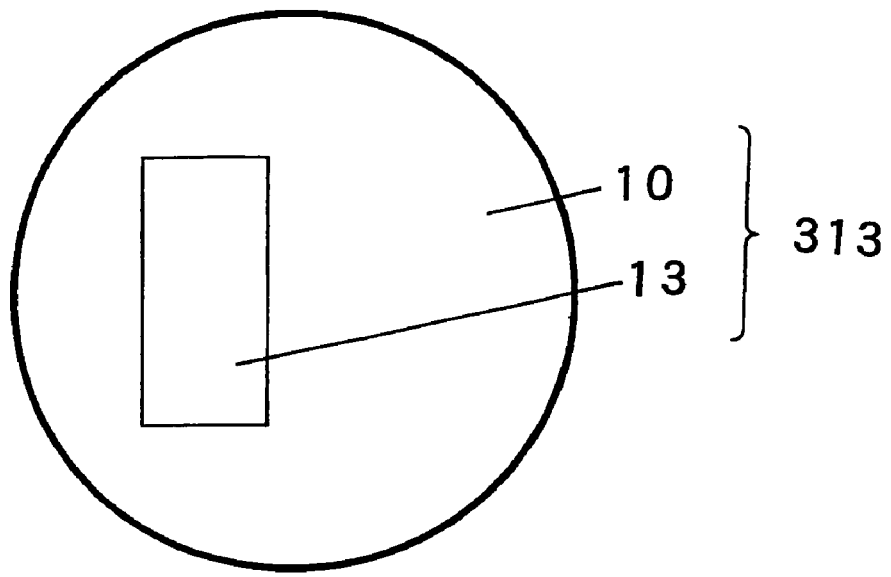
FIGS. 5A and 5B show the structures of the focus detection pixels.
Figure 5B:
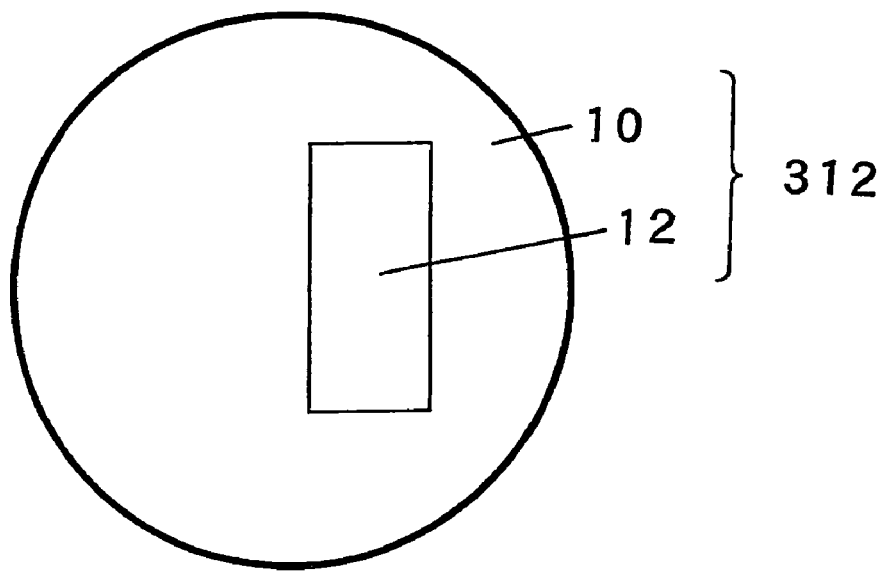

FIGS. 5A and 5B show the structures of the focus detection pixels 312 and 313. As shown in FIG. 5B, the focus detection pixels 312 each include a micro-lens 10 and a photoelectric conversion portion 12. The photoelectric conversion portion 12 assumes the shape of a rectangle, the left side of which is substantially in contact with the vertical bisector extending along the diameter of the micro-lens 10. As shown in FIG. 5A, the focus detection pixels 313 each include a micro-lens 10 and a photoelectric conversion portion 13. The photoelectric conversion portion 13 assumes the shape of a rectangle, the right side of which is substantially in contact with the vertical bisector extending along the diameter of the micro-lens 10. When their micro-lenses 10 are aligned, the photoelectric conversion portions 12 and 13 assume side-by-side positions, one taking up a right-side position and the other taking up a left-side position along the horizontal direction in the figures. The photoelectric conversion portions 12 and 13 are symmetrical with each other relative to the vertical bisector extending along the diameter of the micro-lenses 10. The focus detection pixels 312 and the focus detection pixels 313 are disposed alternately along the horizontal direction in the figures, i.e., along the direction in which the photoelectric conversion portions 12 and 13 are set next to each other.

Figure 7:
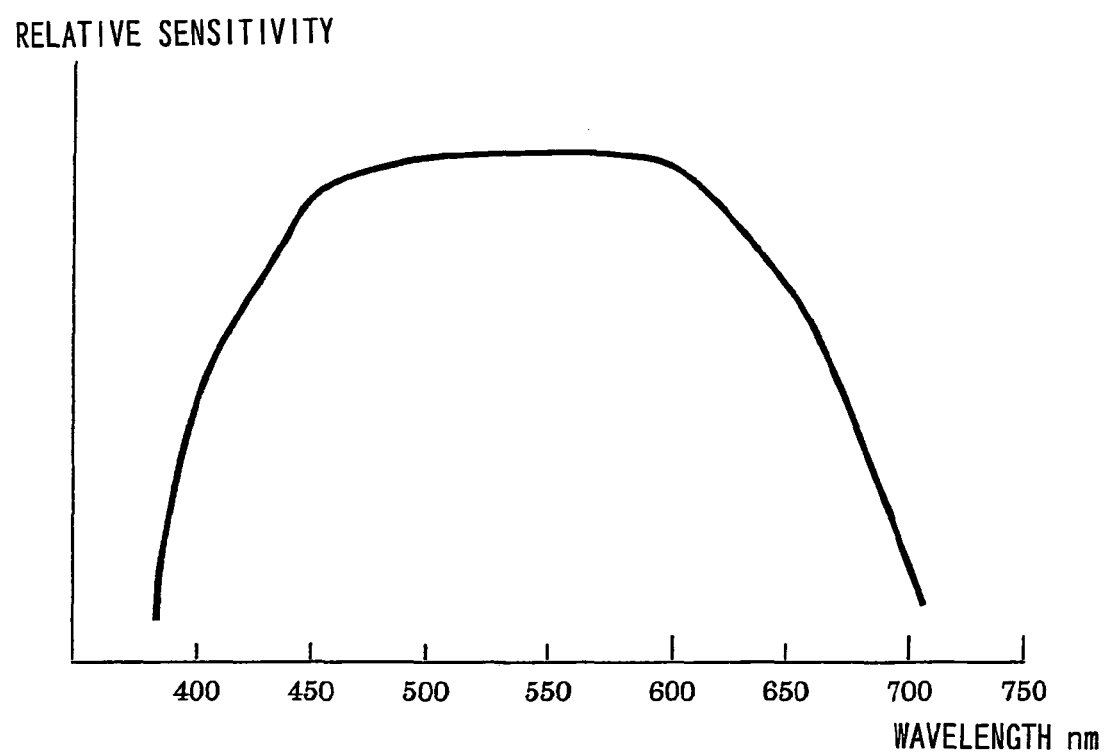
FIG. 7 shows the spectral sensitivity characteristics of the focus detection pixels.

It is to be noted that in order to assure a sufficient light quantity, no color filters are disposed at the focus detection pixels 312 and 313 and thus, the focus detection pixels have the spectral sensitivity characteristics (see FIG. 7), which are achieved by integrating the spectral sensitivity of the photodiodes engaged in photoelectric conversion and the spectral sensitivity characteristics of the infrared cut filters (not shown). Namely, the spectral sensitivity characteristics are similar to the sum of the spectral sensitivity characteristics of the green pixels (G), the red pixels (R) and the blue pixels (B) shown in FIG. 6, which indicate sensitivity in a light wavelength range containing the light wavelength ranges corresponding to the sensitivity characteristics of all the pixels, i.e., the green pixels, the red pixels and the blue pixels.

The photoelectric conversion portion 11 at the image-capturing pixel 310 is designed in a shape that allows the photoelectric conversion portion to receive all the light flux passing through the exit pupil of a highest-speed exchangeable lens, e.g., an exit pupil equivalent to F 1.0, via the micro-lens 10. In addition, the photoelectric conversion portions 12 and 13 at the focus detection pixels 312 and 313 are designed so as to receive all the light fluxes passing through a specific area (e.g., F 2.8) at the exit pupil of the exchangeable lens, via the micro-lens 10.

Figure 8:
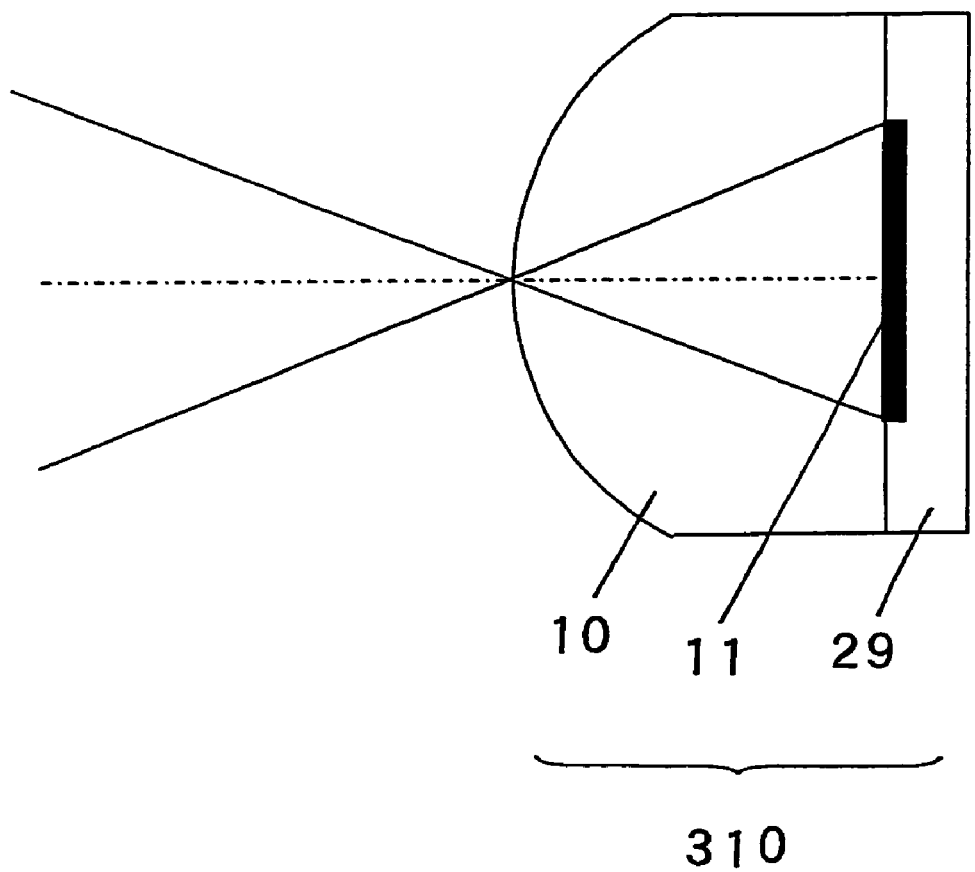
FIG. 8 is a sectional view of an image-capturing pixel.

FIG. 8 is a sectional view of an image-capturing pixel 310. The micro-lens 10 is set to the front of the image-capturing photoelectric conversion portion 11 at the image-capturing pixel 310 and, as a result, an image of the photoelectric conversion portion 11 is projected frontward via the micro-lens 10. The photoelectric conversion portion 11 is formed on a semiconductor circuit substrate 29, with a color filter (not shown) disposed between the micro-lens 10 and the photoelectric conversion portion 11.

Figure 9A:
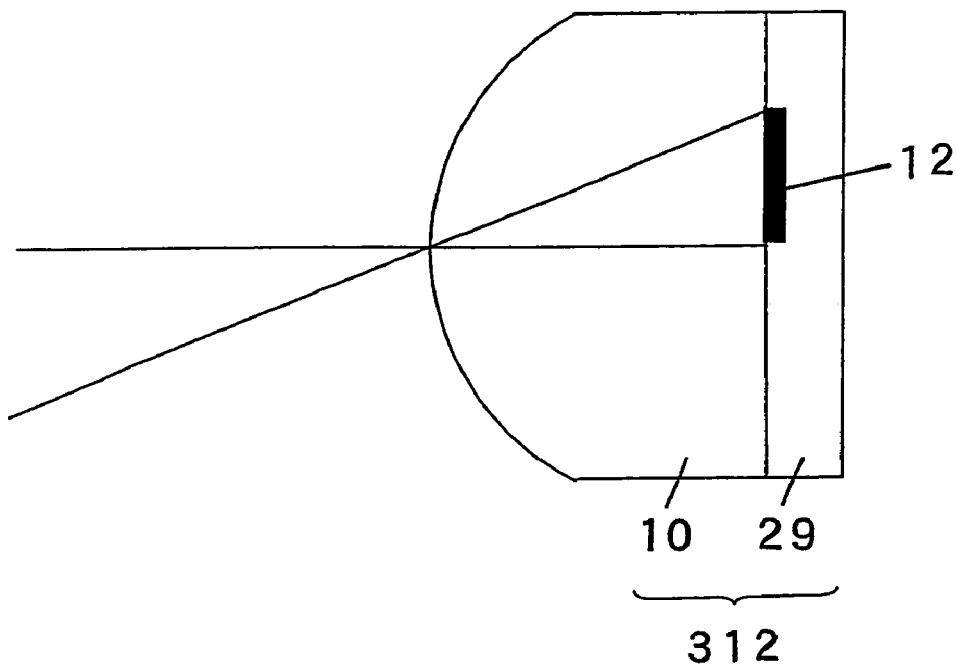
FIGS. 9A and 9B are sectional views of focus detection pixels.
Figure 9B:
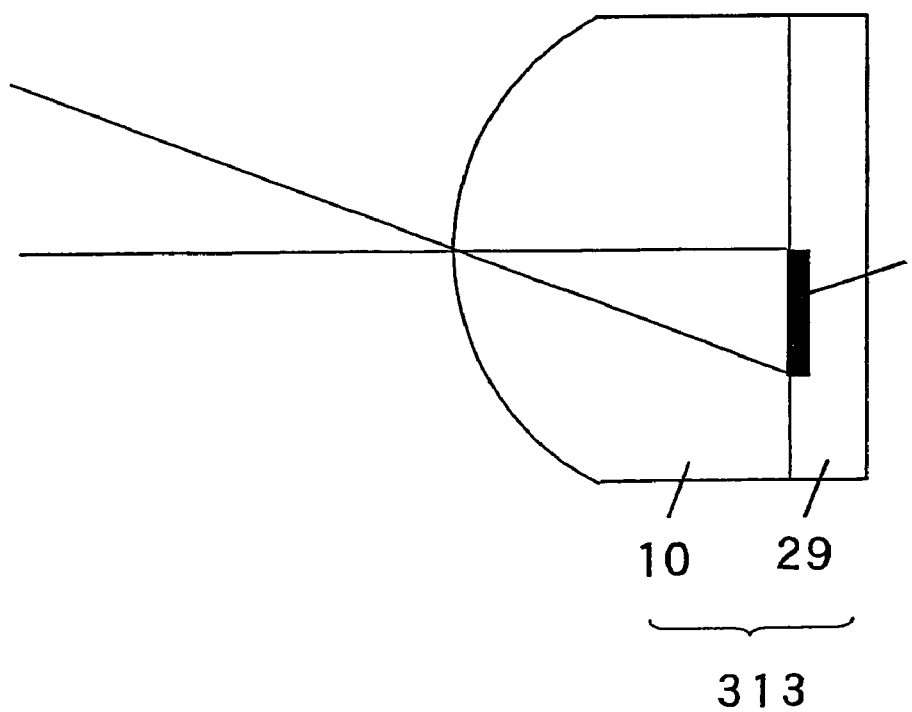

FIGS. 9A and 9B present sectional views of a focus detection pixel 312 and a focus detection pixel 313. The focus detection pixel 312 shown in the sectional view in FIG. 9A includes a micro-lens 10 disposed at the front of the photoelectric conversion portion 12 and the photoelectric conversion portion 12 is projected frontward via the micro-lens 10. The photoelectric conversion portion 12 is formed on the semiconductor circuit substrate 29, and the micro-lens 10 is formed as a fixed, integrated part through a semiconductor image sensor manufacturing process. The photoelectric conversion portion 12 is set on one side of the optical axis of the micro-lens 10.

The focus detection pixel 313 shown in the sectional view in FIG. 9B includes a micro-lens 10 disposed at the front of the photoelectric conversion portion 13 and the photoelectric conversion portion 13 is projected frontward via the micro-lens 10. The photoelectric conversion portion 12 is formed on the semiconductor circuit substrate 29, and the micro-lens 10 is formed as a fixed, integrated part through a semiconductor image sensor manufacturing process. The photoelectric conversion portion 13 is set on the opposite side of the optical axis of the micro-lens 10 from the photoelectric conversion portion 12.

Figure 10:
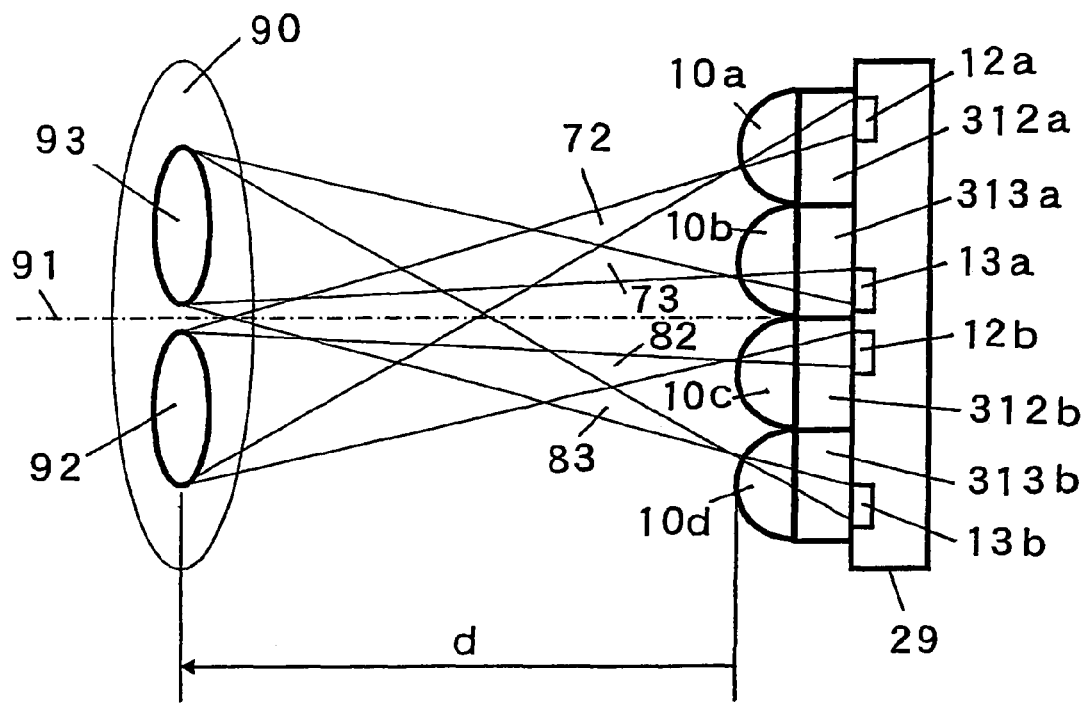
FIG. 10 shows the structure of a focus detection optical system adopting a split-pupil phase difference detection method in conjunction with the use of micro lenses.

FIG. 10 shows the structure of a focus detection optical system adopting a split-pupil-type phase difference detection method in conjunction with the use of micro-lenses. Reference numeral 90 in the figure indicates the exit pupil set over a distance d along the frontward direction from the micro-lenses disposed on the predetermined imaging plane of the exchangeable lens. The distance d is determined in correspondence to the curvature of the micro-lenses, the refractive index of the micro-lenses, the distance between the micro-lenses and the photoelectric conversion portions and the like. The distance d is referred to as a range-finding pupil distance in the following explanation. Reference numeral 91 indicates the optical axis of the exchangeable lens, reference numerals 10a~10d each indicate a micro-lens, reference numerals 12a, 12b, 13a and 13b each indicate a photoelectric conversion portion, reference numerals 312a, 312b 313a and 313b each indicate a pixel and reference numerals 72, 73, 82 and 83 each indicate a light flux.

Reference numeral 92 indicates a range defined by the photoelectric conversion portions 12a and 12b projected via the micro-lenses 10a and 10c, and this range is hereafter referred to as a range-finding pupil. Reference numeral 93 indicates the range defined by the photoelectric conversion portions 13a and 13b projected via the micro-lenses 10b and 10d and this range is hereafter referred to as a range-finding pupil. It is to be noted that while the range-finding pupils 92 and 93 are shown as elliptical areas so as to simplify the illustration in the drawing, the range-finding pupils actually assume the shape of the photoelectric conversion portions projected in an enlargement.

While FIG. 10 provides a schematic illustration of four pixels (the pixels 312a, 312b, 313a and 313b) disposed in sequence next to each other, the photoelectric conversion portions of other pixels, too, receive light fluxes arriving at their micro-lenses from the corresponding range-finding pupils. It is to be noted that the focus detection pixels are arrayed in a direction matching the direction in which the pair of range-finding pupils are set, i.e., matching the direction in which the pair of photoelectric conversion portions are set side-by-side.

The micro-lenses 10a~10d are disposed near the predetermined imaging plane of the exchangeable lens, and as the shapes of the photoelectric conversion portions 12a, 12b, 13a and 13b disposed behind the micro-lenses 10a~10d are projected onto the exit pupil 90 distanced from the micro-lenses 10a~10d by the range-finding pupil distance d, the projected shapes define the range-finding pupils 92 and 93. In other words, the directions along which the photoelectric conversion portions at individual pixels are projected are determined so that the projected shapes (range-finding pupils 92 and 93) of the photoelectric conversion portions at the individual pixels are overlapped on the exit pupil 90 set apart by the projection distance d.

The photoelectric conversion portion 12*a* outputs a signal corresponding to the intensity of an image formed on the micro-lens 10*a* with the light flux 72 having passed through the range-finding pupil 92 and having advanced toward the micro-lens 10*a*. The photoelectric conversion portion 12*b* outputs a signal corresponding to the intensity of an image formed on the micro-lens 10*c* with the light flux 82 having passed through the range-finding pupil 92 and having advanced toward the micro-lens 10*c*. The photoelectric conversion portion 13*a* outputs a signal corresponding to the intensity of an image formed on the micro-lens 10*b* with the light flux 73 having passed through the range-finding pupil 93 and having advanced toward the micro-lens 10*b*. The photoelectric conversion portion 13*b* outputs a signal corresponding to the intensity of an image formed on the micro-lens 10*d* with the light flux 83 having passed through the range-finding pupil 92 and having advanced toward the micro-lens 10*d*.

By linearly disposing large numbers of the two types of focus detection pixels each structured as described above and integrating the outputs from the photoelectric conversion portions at the individual focus detection pixels into output groups each corresponding to one of the two range-finding pupils 92 and 93, information related to the intensity distribution of the pair of images formed on the pixel row with the individual focus detection light fluxes passing through the range-finding pupil 92 and the range-finding pupil 93 is obtained. Image shift detection arithmetic processing (correlation calculation processing, phase difference detection processing) to be detailed later, is subsequently executed by using the information thus obtained so as to detect the extent of image shift (misalignment) manifested by the pair of images through the split-pupil phase difference detection method.

Then, by executing a conversion operation on the image shift quantity in correspondence to the distance between the gravitational centers of the pair of range-finding pupils, the deviation (defocus amount) of the current image forming plane (the image forming plane at the focus detection position corresponding to the position assumed by the micro-lens array on the predetermined imaging plane) relative to the predetermined imaging plane is calculated. It is to be noted that while the explanation is given above by assuming that the range-finding pupils are not restricted at the aperture, the range-finding pupils actually assume the shape and the size determined in correspondence to the aperture.

Figure 11A:
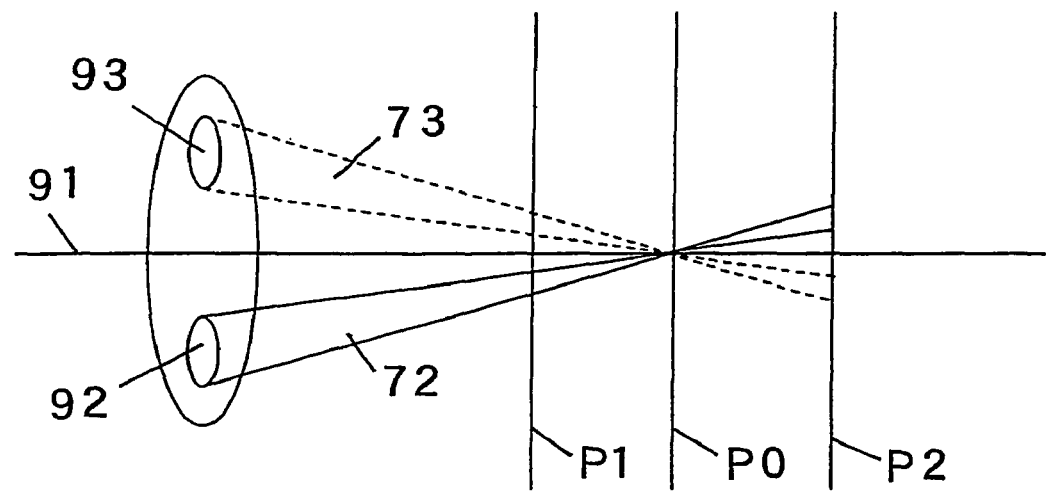
FIGS. 11A through 11D show the relationship between the extent of defocusing and the extent of image shift observed in split-pupil phase difference detection.
Figure 11B:
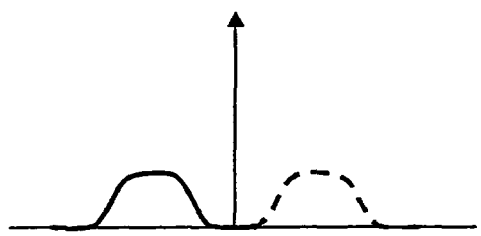
Figure 11C:
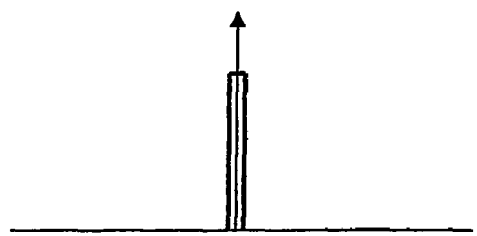

FIGS. 11A through 11D show the relationship between the extent of defocusing and the image shift quantity that may be observed in split-pupil phase difference detection. As shown in FIG. 11A, separate range-finding pupils 92 and 93 are defined at the exit pupil plane 90 of the optical system and the light flux to form an image is divided into a light flux 72 passing through the range-finding pupil 92 and a light flux 73 passing through the range-finding pupil 93. As an image of a line pattern (a white line against a black background) set on the optical axis 91 with the line extending perpendicular to the drawing sheet on which FIG. 11A is drawn, is formed via the optical system, the light flux 72 passing through the range-finding pupil 92 and the light flux 73 passing through the range-finding pupil 93 form high-contrast line image patterns at the same position on the optical axis 91 on the focusing plane P0, as shown in FIG. 11C.

Figure 11D:
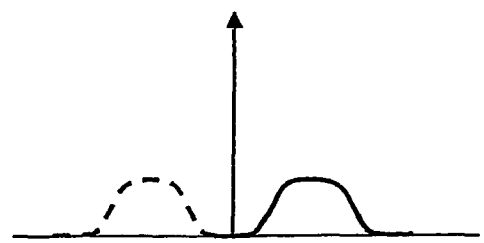

At a plane P1 set further frontward relative to the focusing plane P0, the light flux 72 passing through the range-finding pupil 92 and the light flux 73 passing through the range-finding pupil 93 form blurred line image patterns at different positions, as shown in FIG. 11B. At a plane P2 further rearward relative to the focusing plane P0, the light flux 72 passing through the range-finding pupil 92 and the light flux 73 passing through the range-finding pupil 93 form blurred line image patterns at different positions on the side opposite from that shown in FIG. 11B, as shown in FIG. 11D. Accordingly, by separately detecting the two images formed with the light flux 72 passing through the range-finding pupil 92 and the light flux 73 passing through the range-finding pupil 93 and calculating the positional relationship (image shift quantity) of the two images relative to each other, the state of focal adjustment (defocus amount) of the optical system at the plane at which the two images are detected can be detected.

Figure 12:
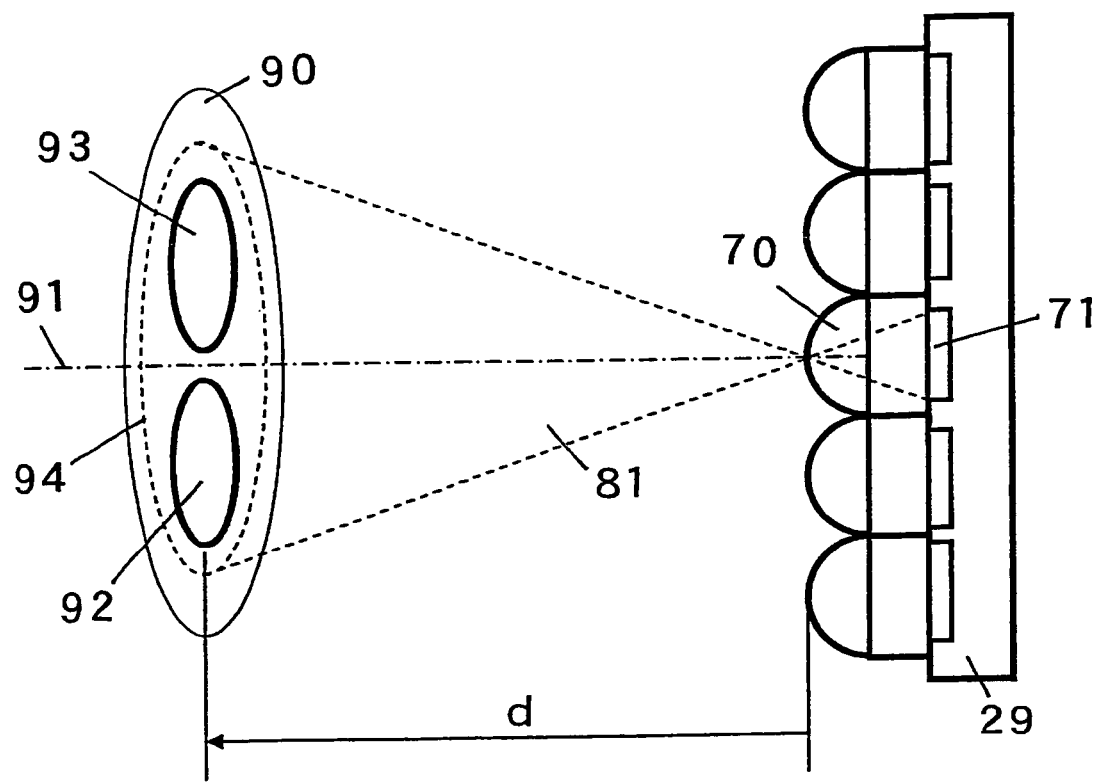
FIG. 12 shows the relationship between the image-capturing pixels and the exit pupil.

FIG. 12 shows the relationship between the image-capturing pixels and the exit pupil. It is to be noted that the same reference numerals are assigned to elements similar to those shown in FIG. 10 and that their explanation is omitted. Reference numeral 70 indicates a micro-lens, reference numeral 71 indicates the photoelectric conversion portion of an image-capturing pixel and reference numeral 81 indicates an image-capturing light flux. In addition, reference numeral 94 indicates the range over which the photoelectric conversion portion 71 is projected via the micro-lens 70. It is to be noted that while FIG. 12 schematically shows the image-capturing pixel (constituted with the micro-lens 70 and the photoelectric conversion portion 71) disposed on the optical axis 91 as an example, the photoelectric conversion portions of the other image-capturing pixels, too, all receive the light flux arriving at the corresponding micro-lenses from the area 94.

The micro-lenses 70 are disposed near the predetermined imaging plane of the optical system and the shape of the photoelectric conversion portion 71 disposed behind the micro-lens 70 on the optical axis 91 is projected onto the exit pupil 90 set apart from the micro-lens 70 by the projection distance*d*. The shape of the projected photoelectric conversion portion defines the area 94.

The photoelectric conversion portion 71 outputs a signal indicating a level corresponding to the intensity of the image formed on the micro-lens 70 with the focus detection light flux 81 having passed through the area 94 and having traveled toward the micro-lens 70. Numerous image-capturing pixels assuming the structure described above are disposed in a two-dimensional array and image information is obtained based upon the signals output from the photoelectric conversion portions at the individual pixels. It is to be noted that while the explanation is given above by assuming that the area 94 is not restricted at the aperture, the area 94 actually assumes the shape and the size determined in correspondence to the aperture.

Figure 13:
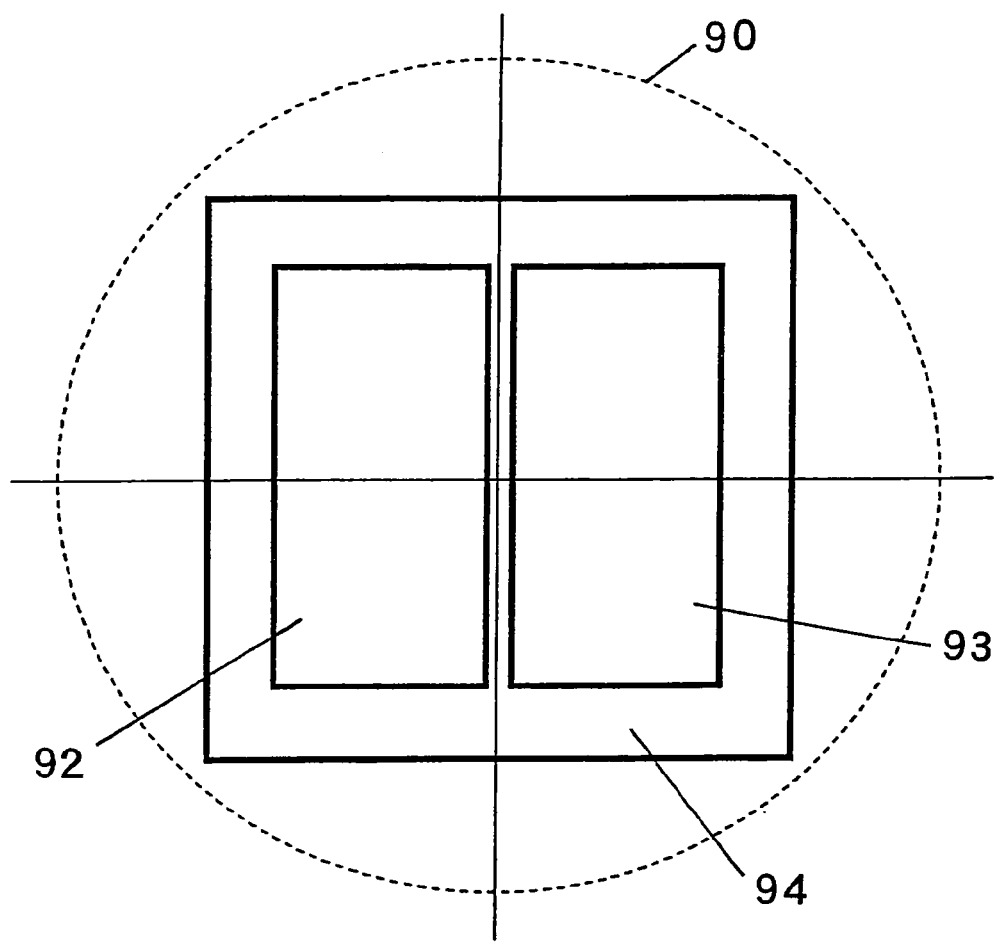
FIG. 13 is a front view showing the relationship between the projection areas achieved at the exit pupil plane.

FIG. 13 presents a front view showing the relationship among the photoelectric conversion portions projected onto the exit pupil. The range-finding pupils 92 and 93 formed by projecting the photoelectric conversion portions at the focus detection pixels onto the exit pupil plane 90 via the micro-lenses are contained in the area 94 formed by projecting the photoelectric conversion portions of the image-capturing pixels onto the exit pupil plane 90 via the micro-lenses of the image-capturing pixels. It is to be noted that the light fluxes received at the photoelectric conversion portions at the image-capturing pixels and the focus detection pixels are in fact light fluxes that pass through areas defined by restricting the area 94 and the range-finding pupils 92 and 93 with the aperture at the exchangeable lens. If an image of a subject with uniform brightness is captured with the photoelectric conversion portions of the image-capturing pixels and the focus detection pixels via the optical system over a uniform length of exposure time (storage time), the signals from the image-capturing pixels assume a level higher than the signal level indicated by the signals from the focus detection pixels.

Figure 14:
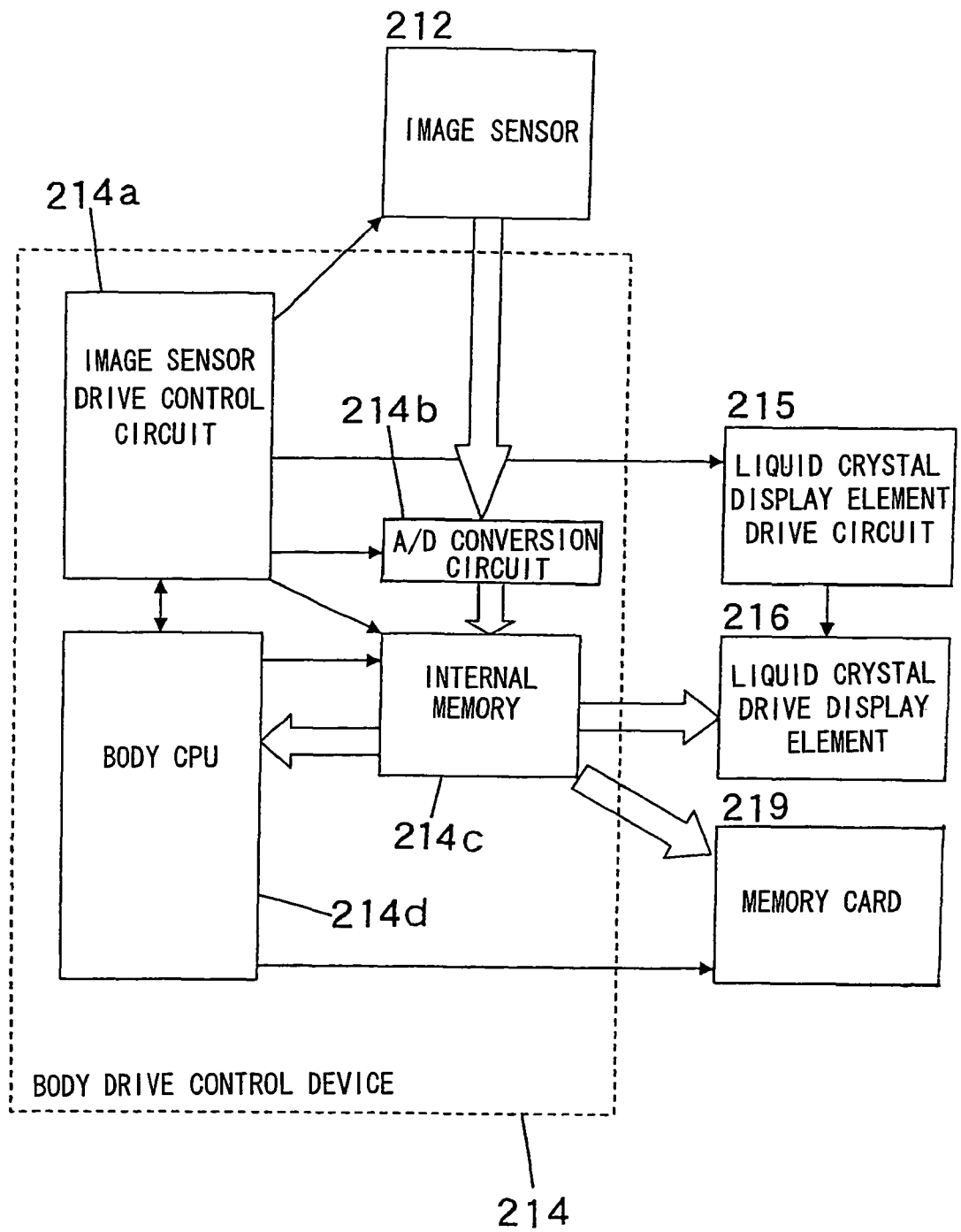
FIG. 14 shows in detail the internal structure of the body of the digital still camera (image-capturing device) shown in FIG. 1.

FIG. 14 shows in detail the internal structure of the body of the digital still camera (image-capturing device) shown in FIG. 1. The body drive control device 214 in FIG. 1 is constituted with an image sensor drive control circuit 214a that controls the drive of the image sensor 212, an A/D conversion circuit 214b that executes A/D conversion to convert the image signals output from the image sensor 212 to image data, an internal memory 214c where the image data are temporarily held and a body CPU 214d that executes overall control of the operations executed in the camera body, engages in communication with the lens drive control device 206 and executes focus detection calculation.

The image sensor drive control circuit 214a controls the length of time over which the image sensor 212 is exposed, controls the image signal read operation and also engages the A/D conversion circuit 214b in operation synchronously with the image signal read operation to store the image data into the internal memory 214c. In addition, it controls the liquid crystal display element drive circuit 215 to bring up on display at the liquid crystal display element 216 the image data cyclically stored into the internal memory 214c and thus, cyclically refresh the display at the liquid crystal display element 216. The image sensor drive control circuit 214a provides the body CPU 214d with a timing signal indicating the timing with which image data are to be stored into the internal memory 214c and information indicating whether the image data from the focus detection pixels are valid or invalid. It is to be noted that the decision as to whether the image data from the focus detection pixels are valid or invalid may be made by judging that image data are valid if they result from a storage operation executed at the focus detection pixels over a predetermined length of time.

The body CPU 214d provides the image sensor drive control circuit 214a with operation control information indicating whether the image sensor 212 is to be engaged in operation cyclically or on a one-off basis and the like and information related to the lengths of exposure time to elapse (determined in correspondence to the output from a photometering sensor (not shown)) at the image-capturing pixels and the focus detection pixels in the image sensor 212. Based upon the information received thereat, the image sensor drive control circuit 214a reads out the image signals by adjusting the operation mode for the image sensor 212 and also controls the lengths of exposure time at the image-capturing pixels and the focus detection pixels, as well as the degree to which the image signals are to be amplified.

If the image data from the focus detection pixels stored in the internal memory 214c are determined to be valid, the body CPU 214d reads them out and executes focus detection by executing the focus detection calculation to be detailed later. In addition, in response to an operation of a shutter release member (not shown), the body CPU controls the image sensor drive control circuit 214a to engage the image sensor 212 in image-capturing operation, takes the resulting image data into the internal memory 214c and corrects the image data or alters the format of the image data before storing the image data into the memory card 219.

Under the control executed by the body CPU 214d, the image sensor drive control circuit 214a engages the image sensor 212 in cyclical operation (e.g., 30 screens/sec or 60 screens/sec) for electrical viewfinder display until a shutter release occurs, and then once an image-capturing instruction is issued, it engages the image sensor 212 in a one-off image-capturing operation. In other words, in a non-image-capturing state, the body CPU 214d first allows valid image data from the focus detection pixels to be stored into the internal memory 214c and then executes the focus detection operation while the viewfinder display is cyclically refreshed.

Figure 15:
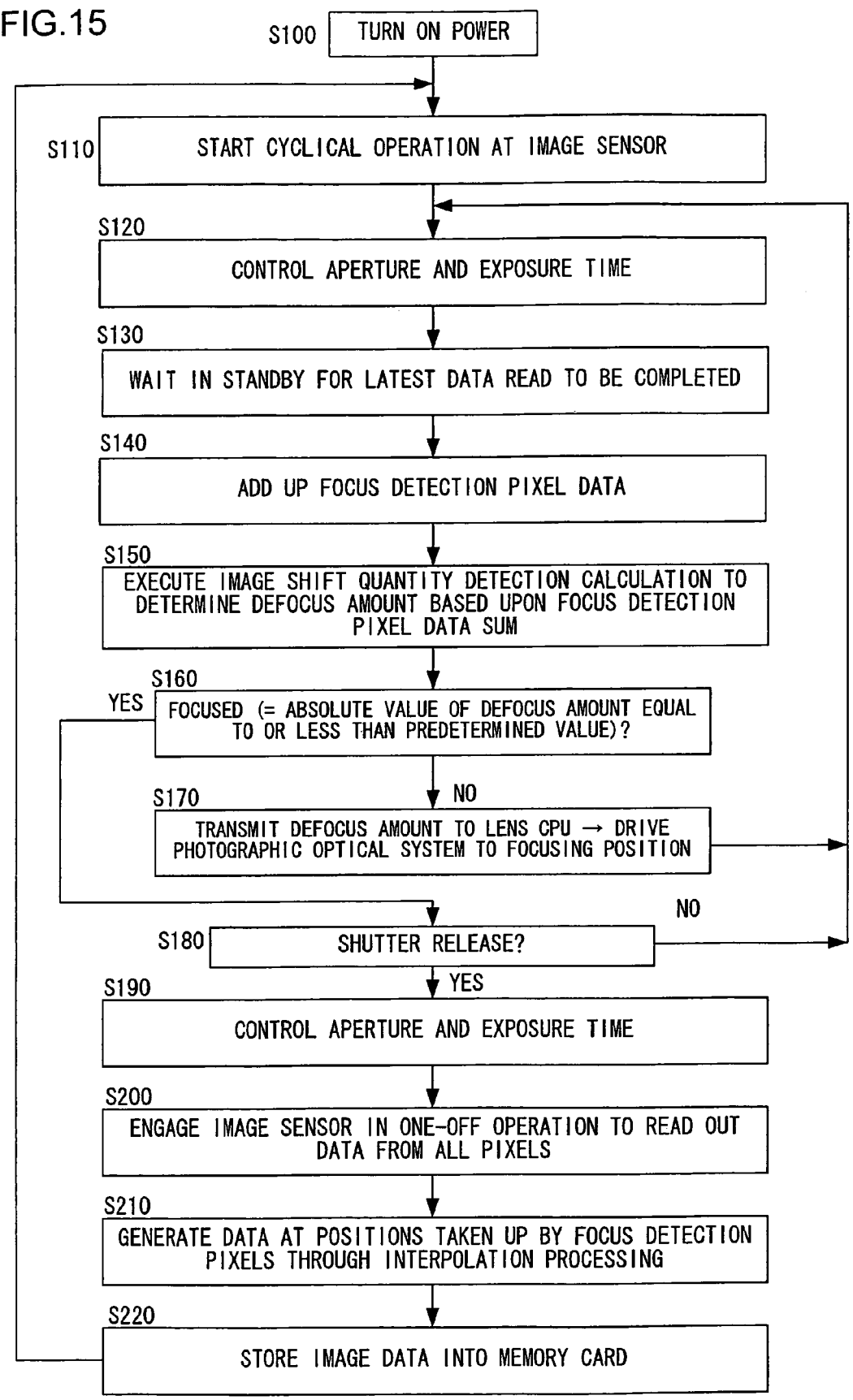
FIG. 15 presents a flowchart of the operations executed in the digital still camera (image-capturing device) shown in FIG. 1.

FIG. 15 presents a flowchart of the operation executed in the digital still camera (image-capturing device) shown in FIG. 1. The body CPU 214d repeatedly executes the operation after power to the camera is turned on. After the power is turned on in step 100, the operation proceeds to step 110 to issue a command for the image sensor drive control circuit 214a to start cyclical operation of the image sensor 212.

In the following step 120, aperture control information corresponding to a photographic aperture value automatically determined based upon the field brightness having been measured by a photometering sensor (not shown), i.e., the display aperture value that allows image signals read out cyclically to achieve a level optimal for display, or a photographic aperture value manually set by the user via an operation member (not shown), is transmitted to the lens drive control device 206 and the aperture diameter is set in correspondence to the photographic aperture value. In addition, the lengths of exposure time at the image-capturing pixels and the focus detection pixels and the signal amplification are updated in correspondence to the photographic aperture value, the field brightness and the levels (average values) of the image data resulting from the most recent operation and the updated information is provided to the image sensor drive control circuit 214a. It is to be noted that a predetermined level value is used immediately after the power is turned on since information indicating the levels (average values) of the image data resulting from the most recent operation is not yet available.

In step 130, the operation waits in standby for a notice indicating that the most recent image data from the focus detection pixels have been stored into the internal memory 214c to be issued from the image sensor drive control circuit 214a. In step 140, the image data originating from the focus detection pixels are read out from the internal memory 214c and addition processing (to be detailed later) is executed by using the image data. In step 150, image shift detection operation processing (correlation operation processing) to be detailed later is based upon the image data having undergone the addition processing to calculate the image shift quantity and then to calculate the defocus amount.

In step 160, a decision is made as to whether or not the current condition is close to a focusing state, i.e., whether or not the absolute value of the defocus amount having been calculated is equal to or less than a predetermined value. If it is decided that the current condition is not close to the focusing state, the operation proceeds to step 170 to transmit the calculated defocus amount to the lens drive control device 206 which then drives the focusing lens 210 at the exchangeable lens 202 to the focusing position. Then, the operation returns to step 120 to repeatedly execute the operation described above. It is to be noted that the operation also branches to this step if focus detection is not possible to transmit a scan drive instruction to the lens drive control device 206. In response, the lens drive control device 206 drives the focusing lens 210 at the exchangeable lens 202 to scan between the infinity position and the close-up position. Subsequently, the operation returns to step 120 to repeatedly execute the operation described above.

If, on the other hand, it is decided that the current condition is close to the focusing state, the operation proceeds to step 180 to make a decision as to whether or not a shutter release has occurred in response to an operation of the shutter release button (not shown). If it is decided that a shutter release has not yet occurred, the operation returns to step 120 to repeatedly execute the operation described above. If it is decided that a shutter release has occurred, the operation proceeds to step 190 to transmit the aperture control information to the lens drive control device 206. In response, the aperture at the exchangeable lens 202 is set to the photographic aperture value. Matching lengths of exposure time and matching degrees of signal amplification are determined for the image-capturing pixels and the focus detection pixels in correspondence to the photographic aperture value, the field brightness and the levels (average values) of the image data resulting from the most recent operations, and information indicating the exposure time and the signal amplification thus determined is then provided to the image sensor drive control circuit 214*a*.

As the aperture control ends, the image sensor 212 is engaged in a one-off image-capturing operation and image data originating from the image-capturing pixels and all the focus detection pixels at the image sensor 212 are read out from the internal memory 214*c* in step 200. In step 210, image data at positions assumed by the individual pixels in the focus detection pixel row are interpolated based upon the data at the focus detection pixels 311 and the data at surrounding image-capturing pixels. In step 220, image data constituted with the data at the image-capturing pixels 310 and the interpolated data are saved into the memory card 219, and then the operation returns to step 110 to repeatedly execute the operation described above.

The focus detection operation executed in step 150 in FIG. 15 is now explained in detail. High-frequency cut filter processing such as that expressed in (1) below is executed on a pair of data strings ($\alpha_1 \sim \alpha_M$ and $\beta_1 \sim \beta_M$; M indicates the number of sets of data) output from the focus detection pixel row, so as to generate a first data string and a second data string ($A_1 \sim A_N$ and $B_1 \sim B_N$), from which a noise component or a high-frequency component that would adversely affect the correlation processing has been eliminated. It is to be noted that the high-frequency cut filter processing may be skipped if the arithmetic operation needs to be completed faster or if the extent of defocusing is already significant and thus it is obvious that only a very small high-frequency component is present.

$$A_n = \alpha_n + 2 \cdot \alpha_{n+1} + \alpha_{n+2},$$

$$B_n = \beta_n + 2 \cdot \beta_{n+1} + \beta_{n+2} \quad (1)$$

In expression (1) above, n=1~N.

The correlation quantity C(k) is calculated by executing a correlation operation expressed in (2) on the data strings $A_n$ and $B_n$ $$C(k) = \Sigma |A_n - B_{n+k}| \quad (2)$$

In expression (2), the $\Sigma$ operation is cumulatively executed with regard to n and the range assumed for n is limited to the range over which the data $A_n$ and $B_{n+k}$ exist in correspondence to the shift quantity k. In addition, the shift quantity k is an integer which represents a relative shift quantity assuming a value taken in units matching the data interval with which the data in the data strings are sampled.

Figure 16A:
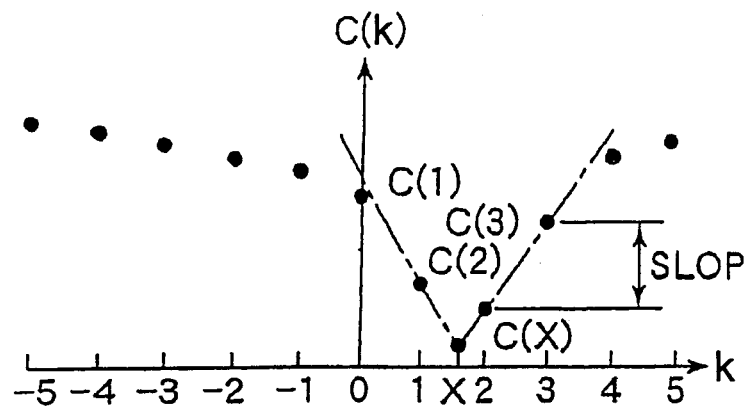
FIGS. 16A through 16C illustrate a focus detection calculation method.

The results of the arithmetic operation executed as expressed in (2) may indicate that the correlation quantity C(k) assumes the smallest value (the smaller the value, the higher the correlation level) at the shift quantity at which the pair of sets of data achieve a high level of correlation (when k=kj=2 in FIG. 16A). The shift quantity x, which gives the smallest value C(x) in the continuous correlation quantity graph, is determined by adopting a three-point interpolation method expressed in (3)~(6) below.

$$x = kj + D/\text{SLOP} \quad (3)$$

$$C(x) = C(kj) - |D| \quad (4)$$

$$D = \{C(kj-1) - C(kj+1)\}/2 \quad (5)$$

$$\text{SLOP} = \text{MAX}\{C(kj+1) - C(kj), C(kj-1) - C(kj)\} \quad (6)$$

Figure 16B:
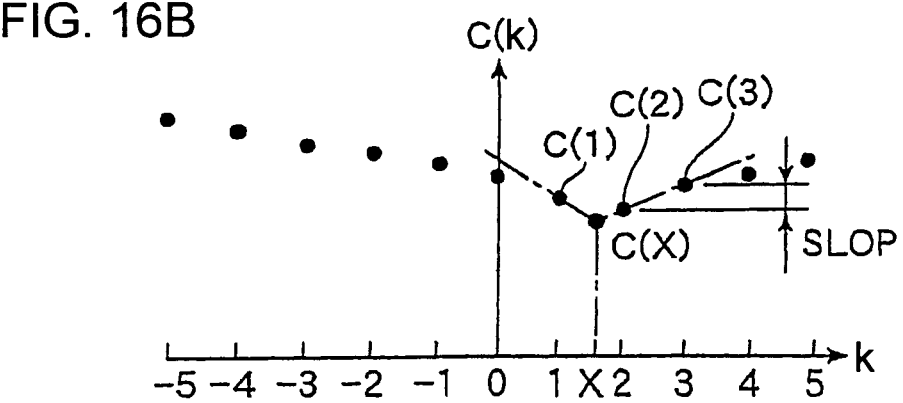

The judgment as to whether or not the shift quantity x calculated as expressed in (3) is reliable is made as follows. As shown in FIG. 16B, the interpolated minimum value C(x) of the correlation quantity increases when the level of correlation between the pair of sets of data is low. Accordingly, if C(x) is equal to or greater than a predetermined threshold value, the shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x is canceled. As a further alternative, if SLOP indicating the value in proportion to the contrast is equal to or less than a predetermined value, the subject should be judged to be a low-contrast subject and, accordingly, the reliability of the calculated shift quantity should be judged to be low and accordingly, the calculated shift quantity x is canceled.

Figure 16C:
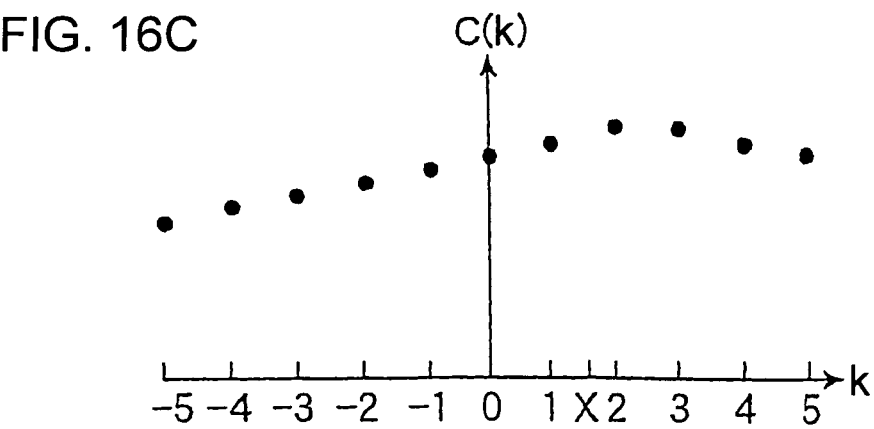

If the level of correlation between the pair of sets of data is low and the correlation quantity C(k) does not dip at all over the shift range kmin to kmax, as shown in FIG. 16C, the minimum value C(x) cannot be determined. In this case, it is decided that focus detection cannot be executed.

The correlation quantity C(k) may be calculated by using the following correlation operation expression instead of correlation operation expression (2).

$$C(k) = \Sigma |A_n \cdot B_{n+1+k} - A_{n+1} \cdot B_{n+k}| \quad (7)$$

In expression (7), the $\Sigma$ operation is cumulatively executed with regard to n and the range assumed for n is limited to the range over which the data $A_n$, $A_{n+1}$, $B_{n+k}$ and $B_{n+1+k}$ exist in correspondence to the shift quantity k.

If the calculated shift quantity x is judged to be reliable, the defocus amount DEF indicating the extent of defocusing of the subject image plane relative to the predetermined imaging plane can be calculated as expressed in (8) below.

$$\text{DEF} = KX \cdot PY \cdot x \quad (8)$$

PY in expression (8) represents the detection pitch (the pitch at which the focus detection pixels are disposed), whereas KX in expression (8) represents the conversion coefficient that is determined in correspondence to the opening angle formed with the gravitational centers of the light fluxes passing through the pair of range-finding pupils. The opening angle formed by the gravitational centers of the light fluxes passing through the pair of range-finding pupils changes in correspondence to the size of the aperture (aperture value) at the exchangeable lens and, accordingly, the opening angle is determined based upon the lens information. In addition, if the data strings in the pair match perfectly (X=0), the data strings will be offset relative to each other by half the detection pitch. Accordingly, the shift quantity x determined as expressed in (8) is first offset by half the data pitch and is thus converted to the image shift quantity X to be used in expression (8).

Figure 17:
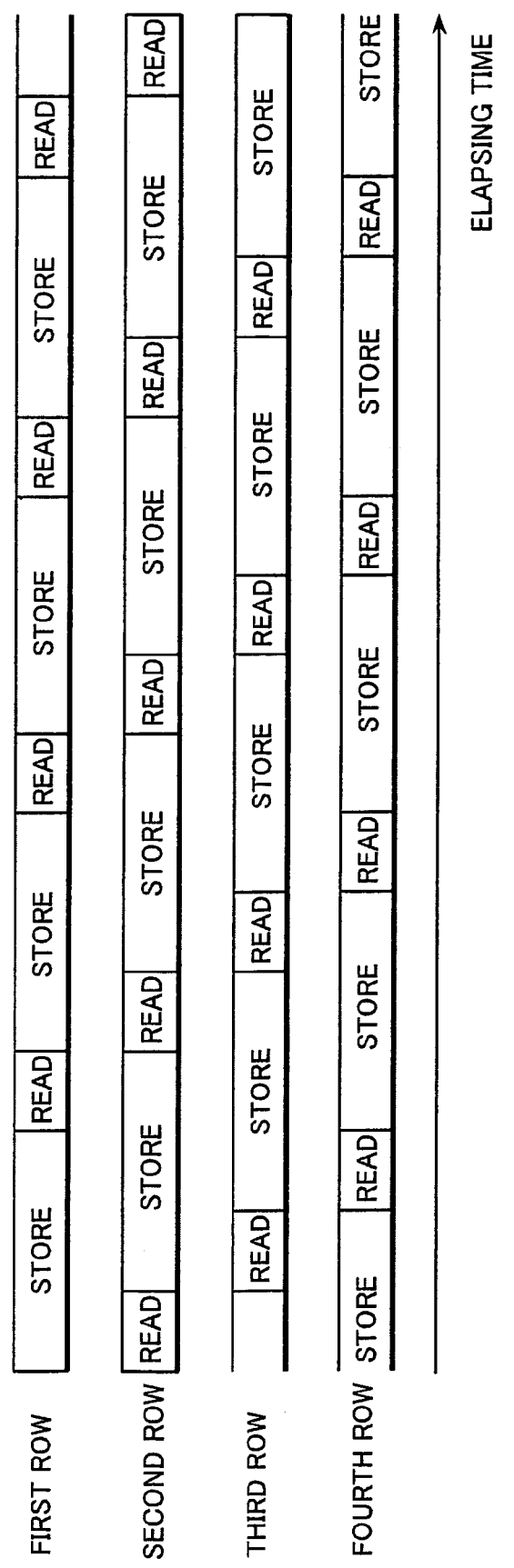
FIG. 17 is a conceptual diagram of the flow of operations executed at an image sensor.

Next, the structure and the operation of the image sensor achieved in an embodiment are explained in detail. FIG. 17 is a conceptual diagram of the flow of the operation executed by the image sensor 212. In order to simplify the explanation, it is assumed that the image sensor 212 includes 4×4 pixels (four rows by four columns) and that two focus detection pixels are disposed at the third row/second column position and at the third row/third column position. The figure shows the operational flow assumed during the cyclical operation. The image sensor 212 is a CMOS image sensor and image signals are read out from the image-capturing pixels through a rolling shutter system. In each row, the charge storage (exposure) at the photoelectric conversion portions and the subsequent read are alternately executed in sequence at the image-capturing pixels. The image signals are read out from the image-capturing pixels in the order of; the first row, the second row, the third row and the fourth row, and the read operation is repeatedly executed over a predetermined cycle.

The image data at the image-capturing pixels having been read out as described above are used for EVF display. In addition, the image data having been previously read out from the focus detection pixels over several read operations are stored in the internal memory 214c, the image data having been read out over a predetermined number of most recent read operations are added up so as to ensure that the level of the image data having undergone the addition processing is optimized for the focus detection calculation and the focus detection calculation is executed based upon the image data having undergone the addition processing.

Through the operational sequence described above, reliable focus detection is assured, while sustaining a constant refresh cycle at the EVF. It is to be noted that when the brightness of the subject is low, the charge storage time at the image-capturing pixels should be controlled so as to ensure that the required read cycle is sustained and that if this restriction results in an insufficient signal level, the degree to which the image signals are amplified should be adjusted.

Figure 18:
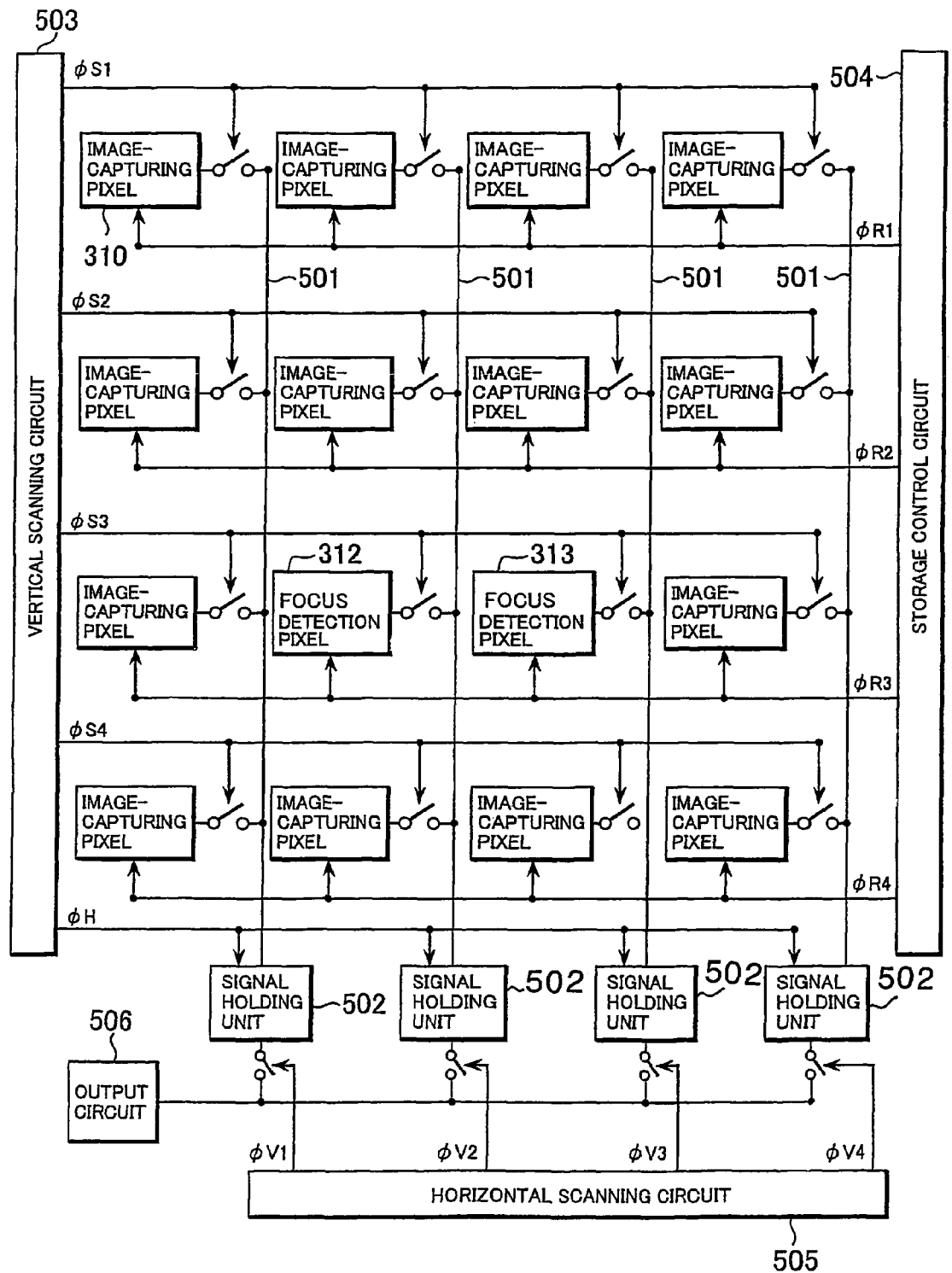
FIG. 18 shows the circuit structure adopted in the image sensor.

FIG. 18 shows the circuit structure of the image sensor 212. As per the operational flow explained in reference to FIG. 17, the image sensor includes 4×4 pixels in its circuit structure, with two focus detection pixels 312 and 313 respectively disposed at the third row/second column position and the third row/third column position. All the other pixels in this circuit structure are image-capturing pixels 310. Signal holding units 502 each constitute a buffer where the image signals from the pixels in a given row are temporarily held, after the image signals output to vertical signal lines 501 are latched in response to a control signal ΔH generated from a vertical scanning circuit 503.

Electrical charge storage at the image-capturing pixels 310 and at the focus detection pixels 312 and 313 is controlled in units of the individual rows independently of one another based upon control signals (ØR1~ØR4) generated by a storage control circuit 504. The image signal output from the image-capturing pixels 310 and the focus detection pixels 312 and 313 is controlled in units of the individual rows independently of one another based upon control signals (ØS1~ØS4) generated by the vertical scanning circuit 503. The image signal at a pixel selected based upon a control signal is output to the corresponding vertical signal line 501. The image signals held in the signal holding units 502 are sequentially transferred to an output circuit 506 in response to control signals (ØV1~ØV4) generated by a horizontal scanning circuit 505 and the transferred signals are then amplified to a specific preset degree at the output circuit 506 from which they are output to the outside.

Figure 19:
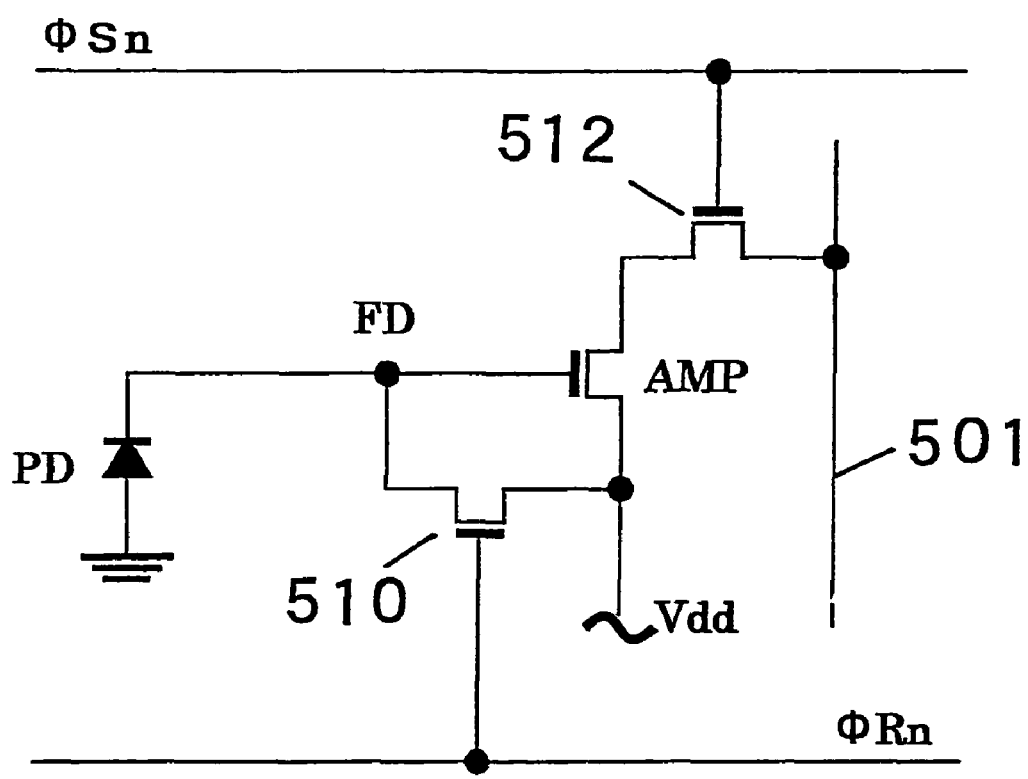
FIG. 19 is a detailed circuit diagram pertaining to the image-capturing pixels and the focus detection pixels shown in FIG. 18.

FIG. 19 is a detailed circuit diagram pertaining to the image-capturing pixels and the focus detection pixels shown in FIG. 18. The photoelectric conversion portion is constituted with a photodiode (PD). The electrical charge stored at the PD is accumulated in a floating diffusion (FD) layer. The FD is connected to the gate of an amplifier MOS transistor (AMP), and the AMP generates a signal corresponding to the quantity of electrical charge accumulated in the FD. The FD portion is connected to a source voltage Vdd via a reset MOS transistor 510 and as the reset MOS transistor 510 is turned on by a control signal ØRn (ØR1~ØR4, ØRa), the electrical charge having been collected in the FD and the PD is cleared, thereby resetting the FD and the PD.

The output from the AMP is connected to the vertical output line 501 via a row selector MOS transistor 512, and as the row selector MOS transistor 512 is turned on by a control signal ØSn (ØS1~ØS4), the output from the AMP is output into the vertical output line 501. It is to be noted that at each pixel assuming the circuit structure shown in FIG. 19, a destructive read through which the image signal is destroyed as it is read out is executed.

Figure 20:
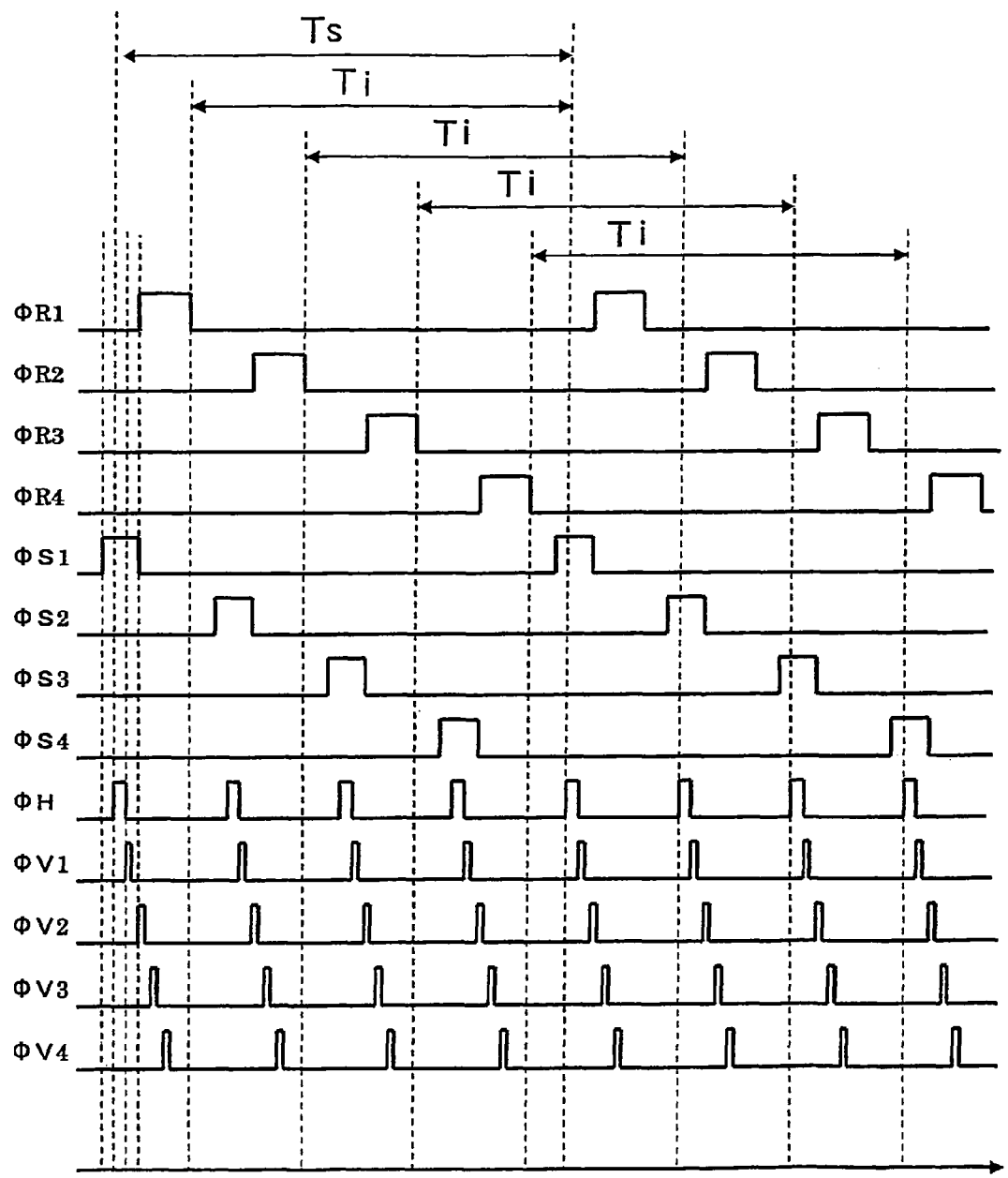
FIG. 20 is an operation timing chart pertaining to the image sensor 212 shown in FIG. 18.

FIG. 20 is a timing chart of the operation executed in the image sensor 212 shown in FIG. 18. The image-capturing pixels 310 in the first row are selected by the control signal ØS1 generated by the vertical scanning circuit 503 and the image signals from the selected image-capturing pixels 310 are output to the vertical signal lines 501. The image signals from the image-capturing pixels in the first row, having been output to the vertical signal lines 501, are temporarily held in the signal holding units 502 based upon a control signal ØH provided in synchronization with the control signal ØS1. The image signals from the image-capturing pixels 310 in the first row held in the signal holding units 502 are transferred to the output circuit 506 in response to the control signals ØV1~ØV4 issued sequentially from the horizontal scanning circuit 505. They are then amplified to the specific preset extent at the output circuit 506 before they are output to the outside.

As the transfer of the image signals at the image-capturing pixels 310 in the first row to the signal holding units 502 ends, the image-capturing pixels 310 in the first row are reset in response to the control signal ØR1 issued by the storage control circuit 504 and the subsequent charge storage starts at the image-capturing pixels 310 in the first row. As the output circuit 506 ends the output of the image signals from the image-capturing pixels 310 in the first row, the image-capturing pixels 310 in the second row are selected by the control signal ØS2 issued by the vertical scanning circuit 503 and the image signals from the selected image-capturing pixels 310 are output to the vertical signal lines 501. Subsequently, the image signals from the image-capturing pixels 310 in the second row are held, the image-capturing pixels 310 in the second row are reset and the image signals are output in a manner similar to that described above.

Next, the image signals from the image-capturing pixels 310 and the focus detection pixels 312 and 313 in the third row are held, the image-capturing pixels 310 in the third row are reset and the image signals from the image-capturing pixels 310 and the focus detection pixels 312 and 313 are output. Then, the image signals from the image-capturing pixels 310 in the fourth row are held, the image-capturing pixels 310 are reset and the image signals from the image-capturing pixels 310 in the fourth row are output. Subsequently, the image-capturing pixels in the first row are selected again and the operation described above is repeated.

Control is executed so that the cycle Ts representing the length of time elapsing between the electrical charge hold timing with which the image signals from the image-capturing pixels 310 in the first row become held and the electrical charge hold timing with which the image signals from the image-capturing pixels 310 in the first row become held next remains constant. The electrical charge storage time T1 (exposure time) at the image-capturing pixels 310 and at the focus detection pixels 312 and 313 matches the length of time elapsing between the time point at which the pixels are reset and the time point at which the image signals become held. By adjusting the pulse width of the control signals ØR1~ØR4, the charge storage time T1 (exposure time) at the image-capturing pixels 310 and the focus detection pixels 312 and 313 can be controlled.

Figure 21:
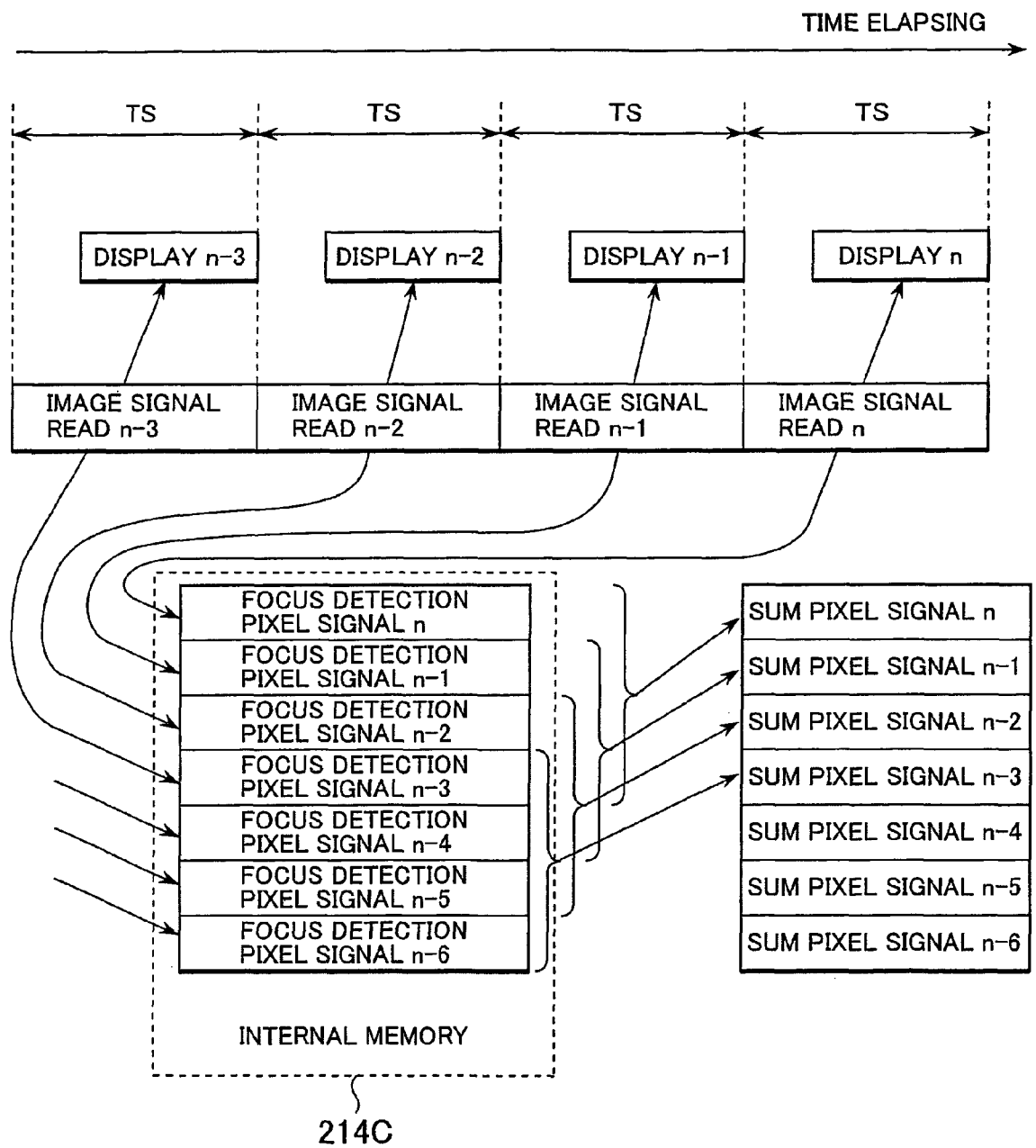
FIG. 21 illustrates the addition processing executed on the image data.

In reference to FIG. 21, the image data addition processing is explained. The time elapsing as the image signal read is executed is indicated on the upper side of FIG. 21. Image signals are read out over the specific cycle Ts and the display is refreshed by using the latest image data, i.e., the image data read out most recently. n indicates the most recent read cycle, n−1 indicates the immediately preceding read cycle and n−2 indicates the read cycle preceding the immediately preceding read cycle. Each of the image signals having been read out through the individual read cycles are stacked and stored in the internal memory 214c (see FIG. 14). The image signals at the focus detection pixels read out in the nth image signal read operation is stored as a focus detection pixel signal n. As the focus detection pixel signal n is stored into the internal memory 214c, the addition processing is started.

Figure 22:
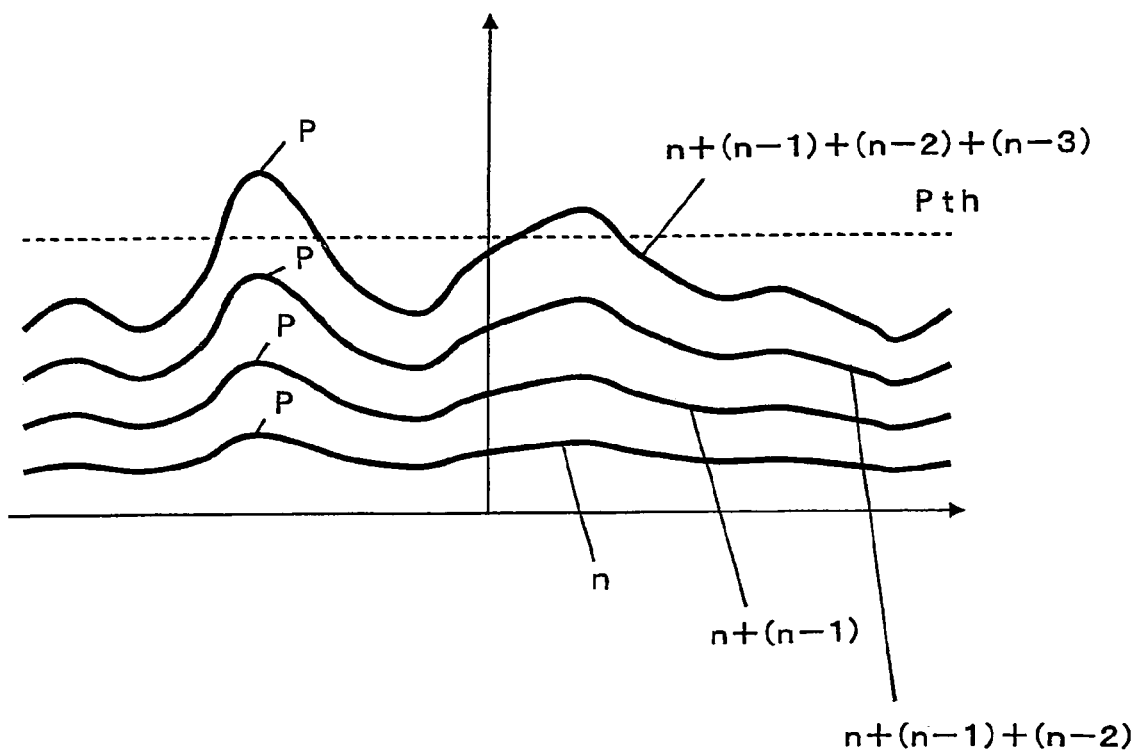
FIG. 22 illustrates specifically how the image data addition processing is executed.

In reference to FIG. 22, the addition processing is described in more specific detail.
(1) First, the maximum value P indicated in the most recent focus detection pixel signal n is compared with a threshold value Pth and if the maximum value exceeds the threshold value, the focus detection pixel signal n is directly used as a sum pixel signal n.
(2) If the maximum value is less than the threshold value, the immediately preceding focus detection pixel signal n−1 is added to the most recent focus detection pixel signal and the maximum value P of the sum of the pixel signals is compared with the threshold value Pth. If the maximum value exceeds the threshold value, the sum of the pixel signals is used as the sum pixel signal n.
(3) If the maximum value is less than the threshold value, a focus detection pixel signal n−2 from the (n−2)th read operation is further added and the maximum value P indicated by the sum of the pixel signals is compared with the threshold value Pth. If the maximum value exceeds the threshold value, the pixel signal sum is used as the sum pixel signal n.
(4) The addition processing described above is repeatedly executed until the maximum value P of the pixel signal sum exceeds the threshold value Pth. It is to be noted that if the maximum value of the pixel signal sum resulting from a predetermined number of addition operations still does not exceed the threshold value Pth, the addition processing is terminated and the pixel signal sum obtained through the predetermined number of addition operations is used as the sum pixel signal n.

(Variations of the Embodiment)

Figure 23:
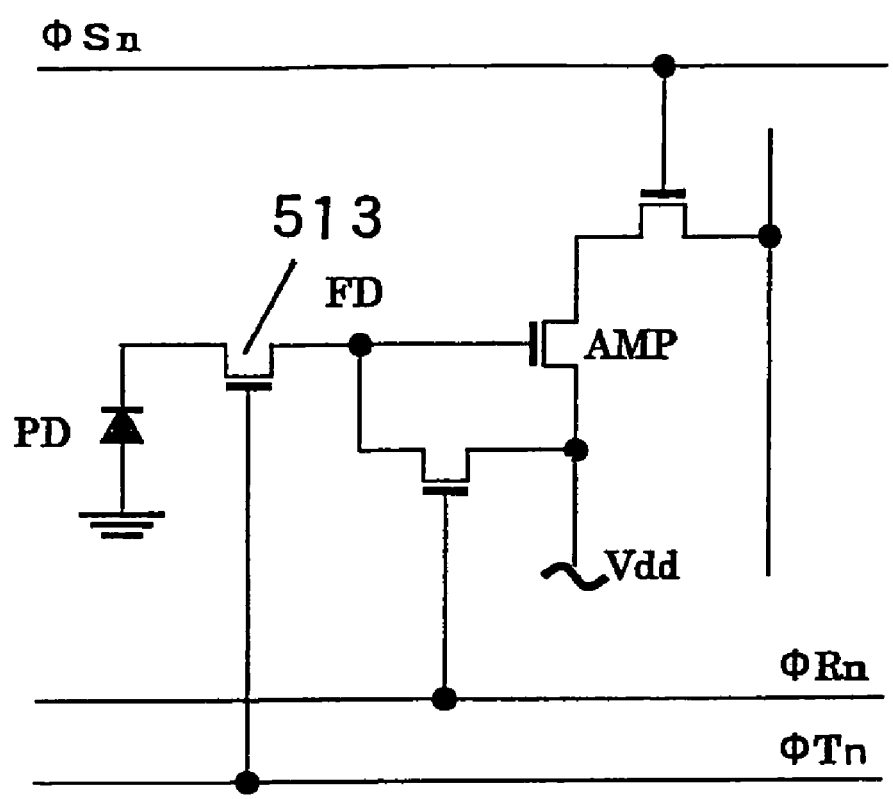
FIG. 23 is a detailed circuit diagram pertaining to image-capturing pixels and the focus detection pixels achieved in a variation.

FIG. 23 is a circuit diagram showing in detail the circuit structure adopted in image-capturing pixels and focus detection pixels in a variation. In the circuit structure adopted in the image-capturing pixels and the focus detection pixels shown in FIG. 19, the PD is directly connected with the FD and thus, the charge storage end timing is regulated by the control signal ØSn. By disposing a switch 513 between the PD and the FD, as shown in FIG. 23, the charge storage end timing can be controlled independently from the control signal ØSn. It is to be noted that the basic circuit structure is otherwise similar to that of the circuit shown in FIG. 19. In the circuit structure adopted for the image-capturing pixels and the focus detection pixels in FIG. 23, the transfer MOS transistor 513 is disposed between the PD and the FD, and as the transfer MOS transistor 513 is turned on by a control signal ØTn, the charge stored at the PD is transferred to the FD.

Figure 24:
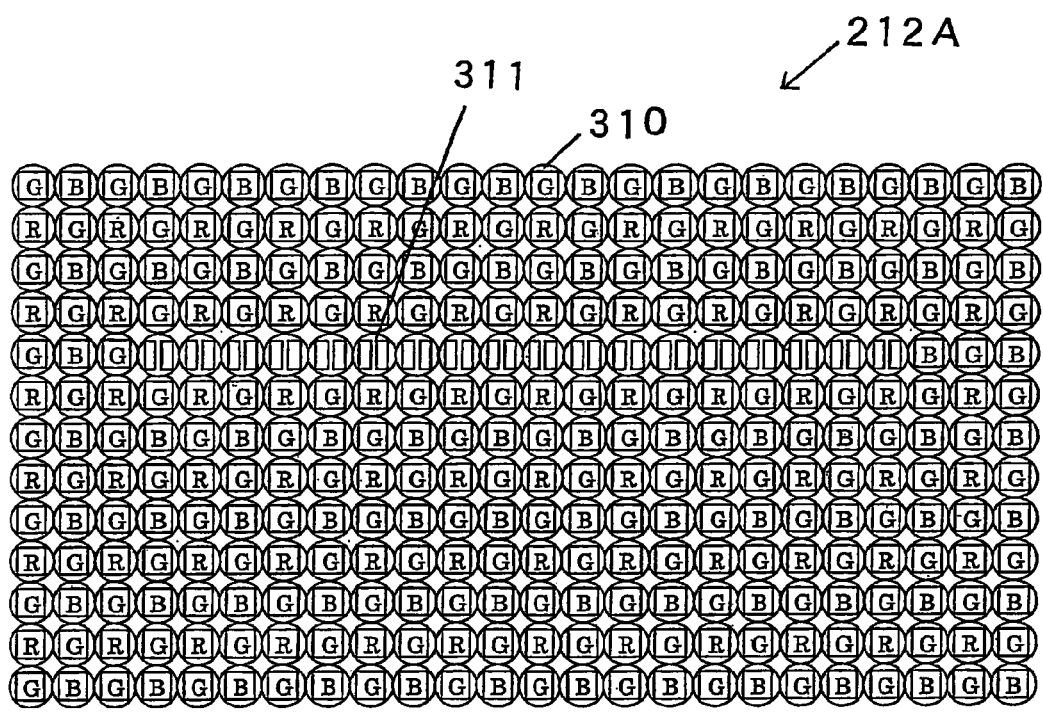
FIG. 24 is a front view showing in detail the structure adopted in an image sensor in a variation.

FIG. 24 is a front view showing in detail the structure adopted in an image sensor 212A achieved in a variation. In the image sensor 212 shown in FIG. 3, each pair of focus detection pixels 312 and 313 respectively shown in FIGS. 5B and 5A works as a unit. The focus detection pixels in the image sensor 212A shown in FIG. 24, on the other hand, each include a pair of photoelectric conversion portions disposed under a single micro-lens. The lengthwise direction and the widthwise direction assumed in FIG. 24, which shows an area in the vicinity of a given focus detection area set on the image sensor 212A in an enlargement, correspond to the lengthwise range and the widthwise range of the photographic image plane 100 in FIG. 2. The image sensor 212A in the variation comprises image-capturing pixels 310 engaged in image-capturing operation and focus detection pixels 311 engaged in focus detection.

Figure 25:
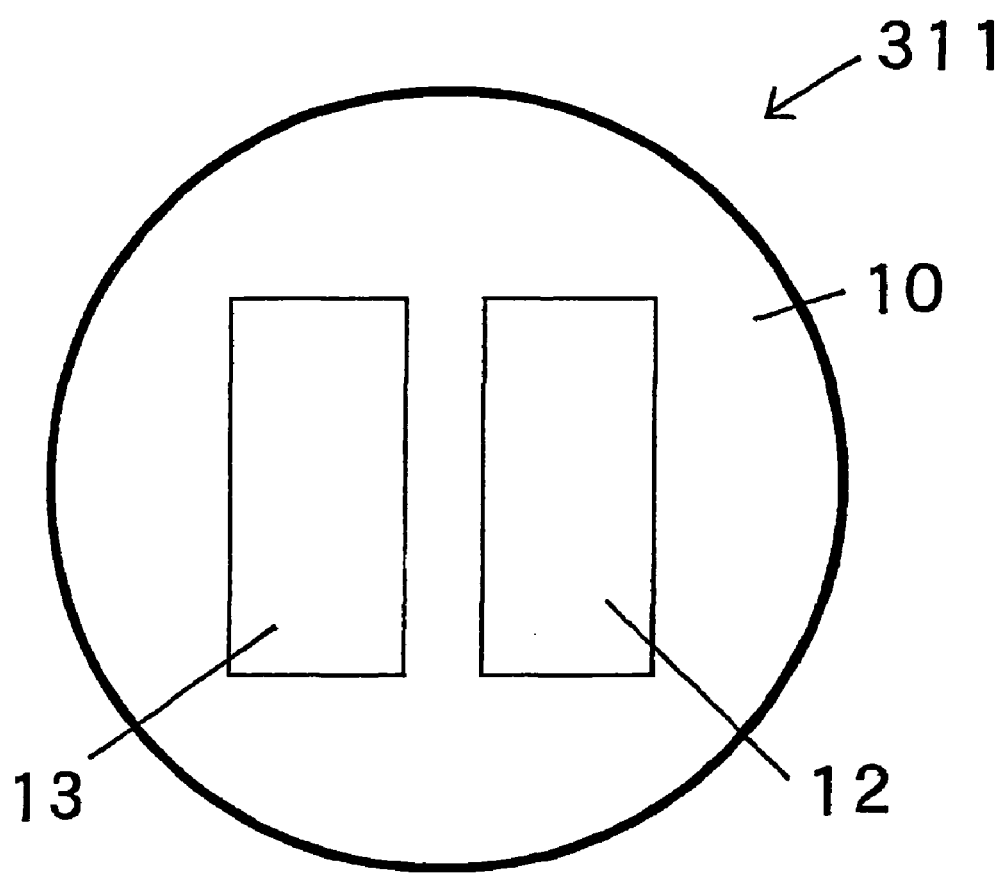
FIG. 25 shows the structure adopted in the focus detection pixels in the image sensor shown in FIG. 24.
Figure 26:
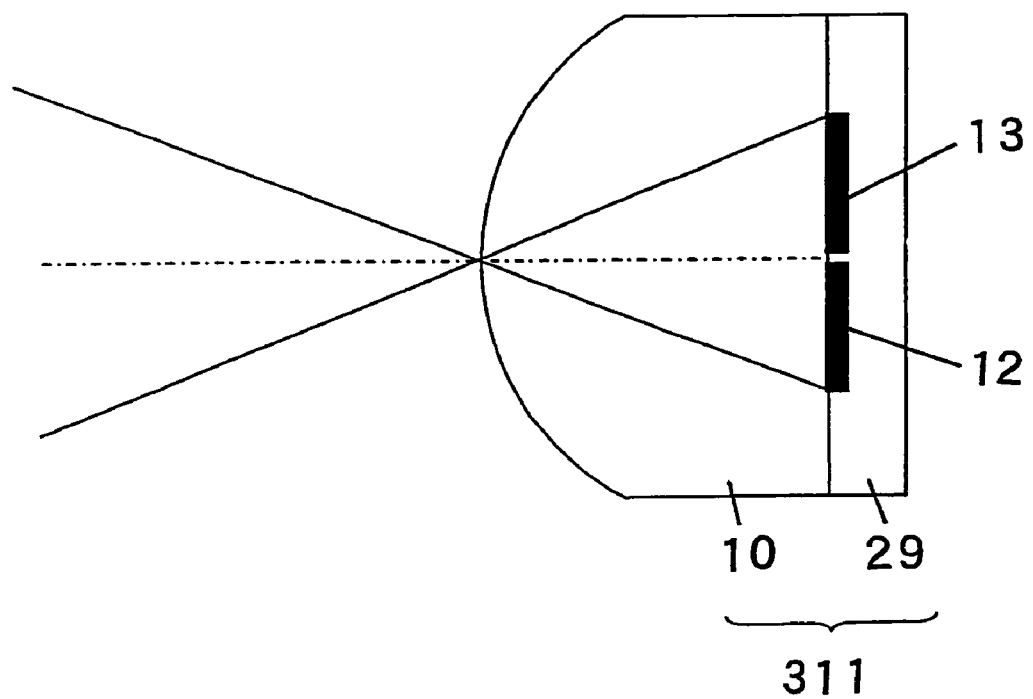
FIG. 26 presents a sectional view of the focus detection pixels in the image sensor shown in FIG. 24.

FIG. 25 shows the structure adopted in the focus detection pixels 311. The focus detection pixels 311 are each constituted with a micro-lens 10 and a pair of photoelectric conversion portions 12 and 13. The photoelectric conversion portions 12 and 13 at the focus detection pixel 311 are designed in a shape that allows the photoelectric conversion portions to receive all the light fluxes passing through specific areas (e.g., F 2.8) of the exit pupil of the exchangeable lens, via the micro-lens 10. FIG. 26 is a sectional view of a focus detection pixel 311. In the focus detection pixel 311, the micro-lens 10 is disposed to the front of the photoelectric conversion portions 12 and 13 used for focus detection and thus, images of the photoelectric conversion portions 12 and 13 are projected frontward via the micro-lens 10. The photoelectric conversion portions 12 and 13 are formed on a semiconductor circuit substrate 29.

Figure 27:
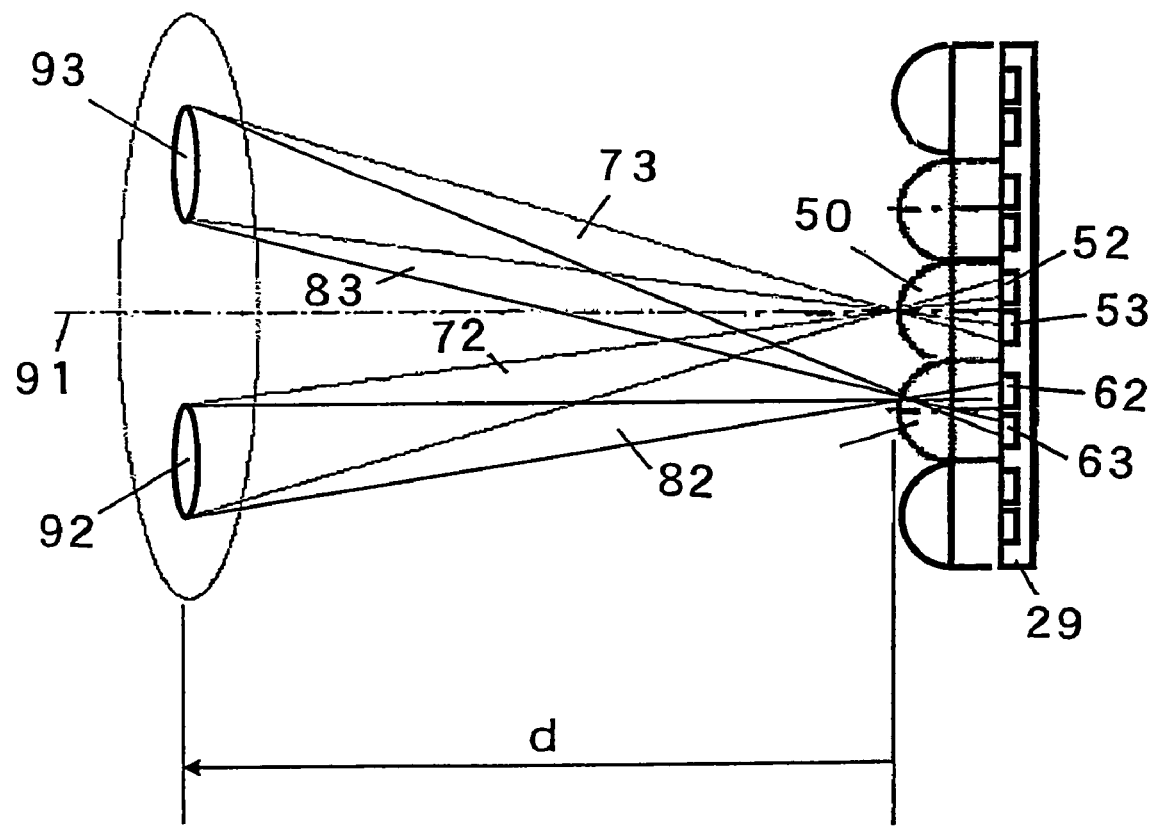
FIG. 27 illustrates how focus detection may be executed through a split pupil method by using the focus detection pixels shown in FIGS. 25 and 26.

FIG. 27 illustrates focus detection executed by adopting a split-pupil method in conjunction with the focus detection pixels 311 shown in FIGS. 25 and 26. It is to be noted that its basic principle is similar to that of the focus detection executed by adopting the split pupil method in conjunction with the focus detection pixels 312 and 313 used in pairs as shown in FIG. 10. While FIG. 27 schematically illustrates a focus detection pixel disposed on the optical axis 91 (constituted with a micro-lens 50 and a pair of photoelectric conversion portions 52 and 53) and an adjacent focus detection pixel (constituted with a micro-lens 60 and a pair of photoelectric conversion portions 62 and 63), the pair of photoelectric conversion portions at each of the other focus detection pixels receives light fluxes arriving at the corresponding micro-lens from the pair of range-finding pupils. The focus detection pixels are disposed along the direction in which the pair of range-finding pupils 92 and 93 are set side-by-side, i.e., along the direction in which the photoelectric conversion portions in each pair are set side-by-side.

The micro-lenses 50 and 60 are set near the predetermined imaging plane of the optical system. The shapes of the pair of photoelectric conversion portions 52 and 53 disposed behind the micro-lens 50 are projected via the micro-lens 50 set on the optical axis 91 onto the exit pupil 90 set apart from the micro-lenses 50 and 60 by the projection distance d, and the projected shapes define range-finding pupils 92 and 93. The shapes of the pair of photoelectric conversion portions 62 and 63 disposed behind the micro-lens 60 are projected via the micro-lens 60 set off the optical axis 91 onto the exit pupil 90 set apart by the projection distance d, and the projected shapes define the range-finding pupils 92 and 93. Namely, the projecting direction for each pixel is determined so that the projected shapes (range-finding pupils 92 and 93) of the photoelectric conversion portions in the individual pixels are aligned on the exit pupil 90 set over the projection distance d.

The photoelectric conversion portion 52 outputs a signal corresponding to the intensity of an image formed on the micro-lens 50 with a focus detection light flux 72 having passed through the range-finding pupil 92 and having advanced toward the micro-lens 50. The photoelectric conversion portion 53 outputs a signal corresponding to the intensity of an image formed on the micro-lens 50 with a focus detection light flux 73 having passed through the range-finding pupil 93 and having advanced toward the micro-lens 50. Also, the photoelectric conversion portion 62 outputs a signal corresponding to the intensity of an image formed on the micro-lens 60 with a focus detection light flux 82 having passed through the range-finding pupil 92 and having advanced toward the micro-lens 60. The photoelectric conversion portion 63 outputs a signal corresponding to the intensity of an image formed on the micro-lens 60 with a focus detection light flux 83 having passed through the range-finding pupil 93 and having advanced toward the micro-lens 60.

Numerous focus detection pixels 311 each structured as described above are arranged in a straight row and the outputs from the pairs of photoelectric conversion portions at the individual pixels are integrated into output groups each corresponding to one of the two range-finding pupils 92 and 93. Thus, information related to the intensity distribution of the pair of images formed on the focus detection pixel row with the individual focus detection light fluxes passing through the pair of range-finding pupils 92 and 93 is obtained.

Figure 28:
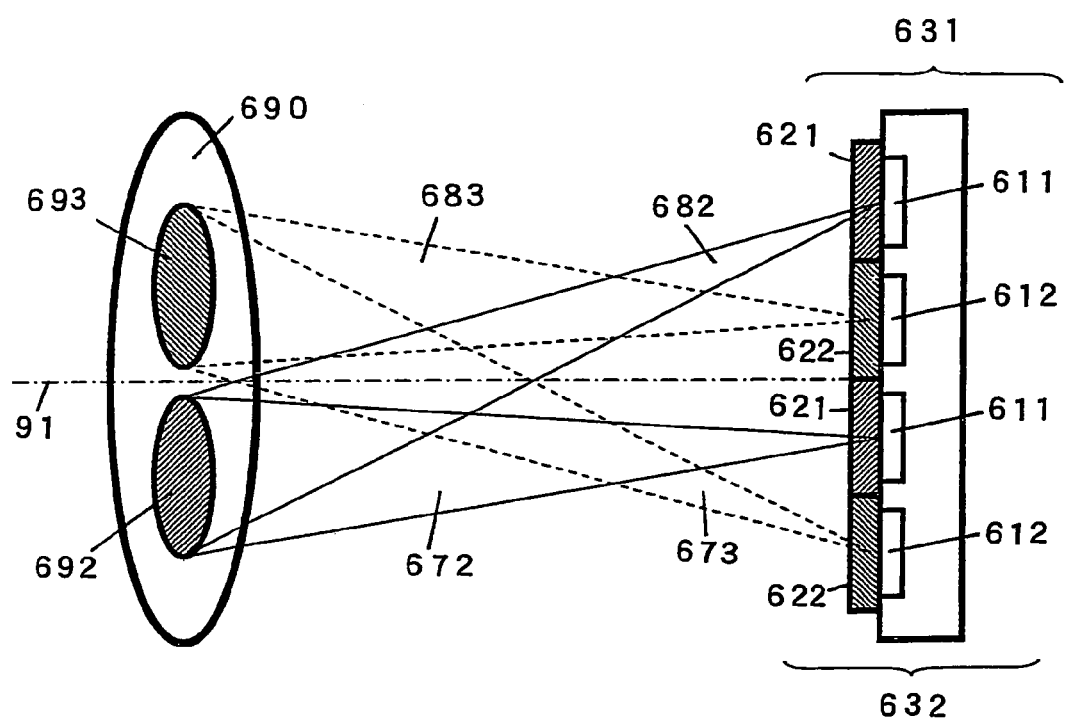
FIG. 28 illustrates how focus detection may be executed by adopting a split-pupil method in conjunction with the use of polarization filters.

FIG. 28 illustrates the concept of focus detection executed by adopting a split-pupil method in conjunction with polarization filters. While the split-pupil focus detection is executed by using micro-lenses in the embodiment and the variation thereof described above, focus detection may also be detected through the split pupil method in conjunction with polarization filters. FIG. 28 schematically shows four pixels adjacent to one another. Reference numeral 690 in FIG. 28 indicates a polarization filter holding frame. The area that is not taken up by the polarization filters is shielded from light at the holding frame. The polarization filter holding frame 690 is disposed near the aperture of the exchangeable lens. Reference numeral 692 indicates a polarization filter, and a range-finding pupil is defined in correspondence to the position and shape of the polarization filter 692. Reference numeral 693 also indicates a polarization filter, and a range-finding pupil is defined in correspondence to the position and shape of the polarization filter 693. The polarization filter 693 is disposed so that its polarizing direction extends perpendicular to the polarizing direction of the polarization filter 692. Reference numeral 91 indicates the optical axis of the exchangeable lens. Reference numeral 621 indicates a polarization filter, the polarizing direction of which matches that of the polarization filter 692. Reference numeral 622 indicates a polarization filter, the polarizing direction of which matches that of the polarization filter 693. Reference numerals 611 and 612 each indicate a photoelectric conversion portion. Reference numeral 631 and 632 each indicate a pixel. It is to be noted that reference numerals 672, 673, 682 and 683 each indicate a light flux.

The pixel 631, where the light flux having passed through the range-finding pupil formed by the polarization filter 692 is received at the photoelectric conversion portion 611 through the polarization filter 621, outputs a signal indicating the intensity of the image formed with the light flux 672 or 682. The pixel 632, where the light flux having passed through the range-finding pupil formed by the polarization filter 693 are received at the photoelectric conversion portion 612 through the polarization filter 622, outputs a signal indicating the intensity of the image formed with the light flux 673 or 683.

By disposing numerous pixels 631 and 632 equipped with polarization filters as described above in a two-dimensional array and integrating the outputs from the photoelectric conversion portions of the individual pixels into output groups each corresponding to one of the range-finding pupils, information related to the distribution of the intensity of the pair of images formed on the pixel row with the focus detection light fluxes passing through the two range-finding pupils can be obtained. By executing image shift detection calculation processing (correlation arithmetic processing and phase-difference detection processing) on this information, the extent of image shift manifested by the pair of images can be detected through the split-pupil phase-difference detection method.

Figure 29:
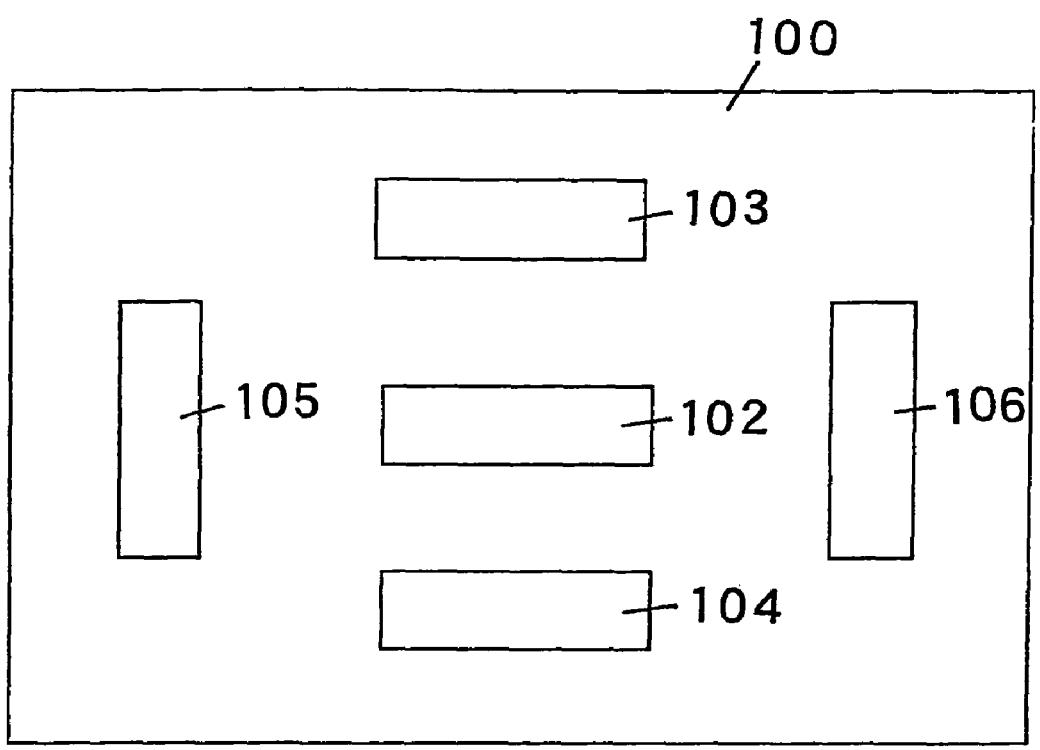
FIG. 29 presents an example of another positional arrangement that may be adopted for focus detection areas set on the image-capturing plane.

FIG. 29 shows focus detection areas set on the image-capturing plane in another example. The quantity and position that may be assumed for the focus detection area are not limited to those shown in FIG. 2. FIG. 29 presents an example of areas (focus detection areas, focus detection positions) at which the image may be sampled on the image-capturing plane during focus detection executed over focus detection pixel rows (lines). Five focus detection areas 102~106 are set on a captured image plane 100. Focus detection pixels are disposed in a straight line/along the longer side of each focus detection area assuming a rectangular shape. The user may manually select a specific focus detection area among the plurality of focus detection areas by operating an operation member (not shown) in correspondence to the image composition, or all the focus detection areas may be selected and the optimal set of focus detection results among the plurality of sets of focus detection results obtained through the focus detection operation may be automatically selected.

When the operation is to be executed simultaneously over all the focus detection areas, image data are cyclically read out from the image sensor and, at the same time, image data from the focus detection pixels in the various focus detection areas are stacked and stored in correspondence to the individual focus detection areas while cyclically refreshing the screen display at the EVF. By individually executing the addition processing explained in reference to FIG. 21 in correspondence to each focus detection area every time new image data become stored, sum image data optimal for the focus detection calculation are generated in correspondence to the individual focus detection areas. Then, the extent of defocus manifesting in each focus detection area is calculated by executing focus detection calculation processing on the sum image data generated for the particular focus detection area. Based upon a plurality of defocus quantities representing the extents of defocusing, the ultimate defocus amount is determined by using an appropriate algorithm (averaging, closest subject or the like). In this case, even when there is a significant difference among the levels of brightness in the various focus detection areas, the level of the image data used for the focus detection in each focus detection area can be sustained at an optimal level and focus detection can be executed in all the focus detection areas with a high level of reliability while cyclically reading out the image signals for display through a destructive read.

Figure 30:
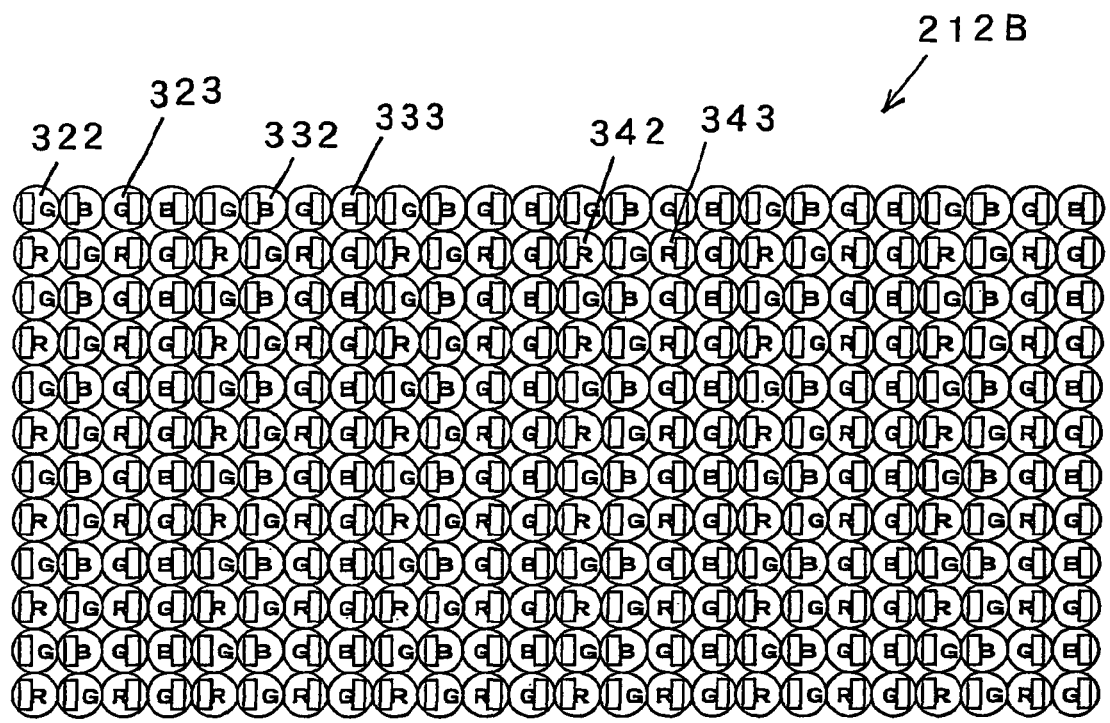
FIG. 30 is a front view showing in detail the structure adopted in an image sensor in a variation.

FIG. 30 is a front view showing in detail the structure adopted in an image sensor 212B in a variation. The lengthwise direction and the widthwise direction assumed in FIG. 30, which shows part of the image sensor 212B in an enlargement, corresponds to the lengthwise range and the widthwise range of the image-capturing plane in FIG. 2. The focus detection pixels 312 and 313 in the image sensor 212 shown in FIG. 3 are not equipped with color filters and are disposed in place of image-capturing pixels 312 over part of the image-capturing pixel array. All the pixels in the alternative image sensor 212B in FIG. 30 are focus detection pixels, each equipped with a color filter.

The image sensor 212B includes focus detection pixel pairs, each constituted with a focus detection pixel 322 and a focus detection pixel 323 equipped with green color filters, focus detection pixel pairs, each constituted with a focus detection pixel 332 and a focus detection pixel 333 equipped with blue color filters and the focus detection pixel pairs, each constituted with a focus detection pixel 342 and a focus detection pixel 343 equipped with red color filters, arrayed as shown in the figure. The color filters are disposed in a Bayer array so as to allow the image signals from the focus detection pixels to be directly utilized as display image signals. Based upon a pair of image signal groups corresponding to each of the colors assumed in the filters, focus detection can be executed in correspondence to the individual colors. The structure described above allows any number of focus detection areas to be set at any position.

Figure 31:
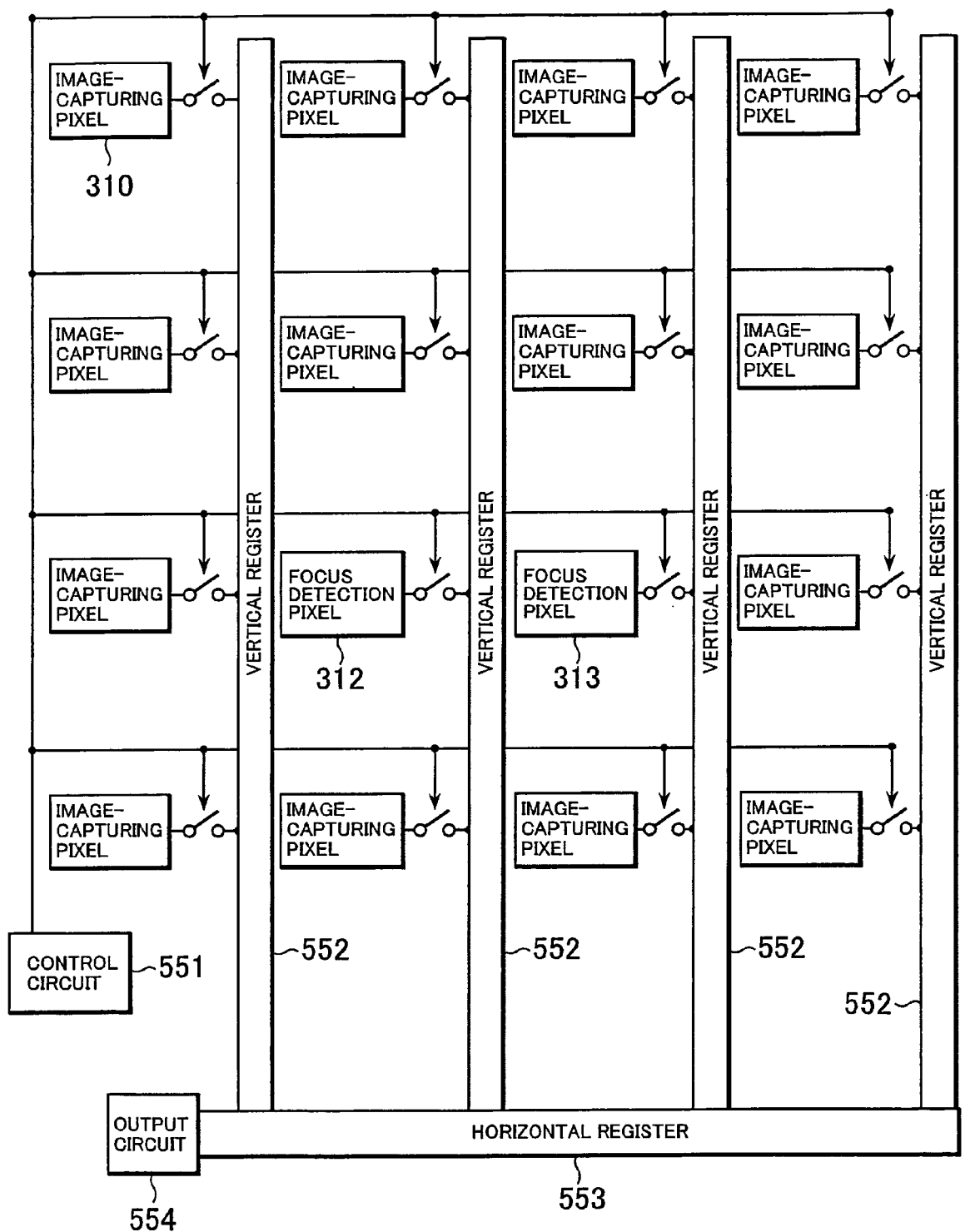
FIG. 31 is a conceptual diagram showing the circuit structure adopted in an image sensor in a variation.

FIG. 31 is a conceptual diagram showing the circuit structure adopted in a variation of the image sensor. The image sensor in the conceptual diagram presented in FIG. 18 adopts a CMOS circuit structure, in which the image signals are read out through a rolling shutter system. The image sensor shown in the conceptual diagram in FIG. 31, on the other hand, adopts a CCD circuit structure in which the image signals at all pixels are read out simultaneously through a simultaneous exposure system. FIG. 31 shows an image sensor in a 4×4 pixel layout, with the focus detection pixels 312 and 313 disposed at the third row/second column position and the third row/third column position. All the other pixels in FIG. 31 are image-capturing pixels 310. Charges are stored at the image-capturing pixels 310 and at the focus detection pixels 312 and 313 with uniform timing under control executed by a control circuit 551 and the electrical charges thus stored at the pixels are all transferred to vertical registers 552 simultaneously.

The electrical charges having been transferred to the vertical registers 552 are then transferred to a horizontal register 553, the electrical charges from a single row at a time. The image signals from a given row having been transferred to the horizontal register 553 are then transferred to an output circuit 554 via the horizontal register 553, and are output to the outside by the output circuit. As the transfer of the image signals from the particular row via the horizontal register 553 ends, image signals corresponding to another row are transferred from the vertical registers 552 toward the horizontal register. The horizontal register 553, in turn, outputs the image signals from the row to the outside. By repeating the operation described above, the image signals from the four rows are output to the output recipient.

Figure 32:
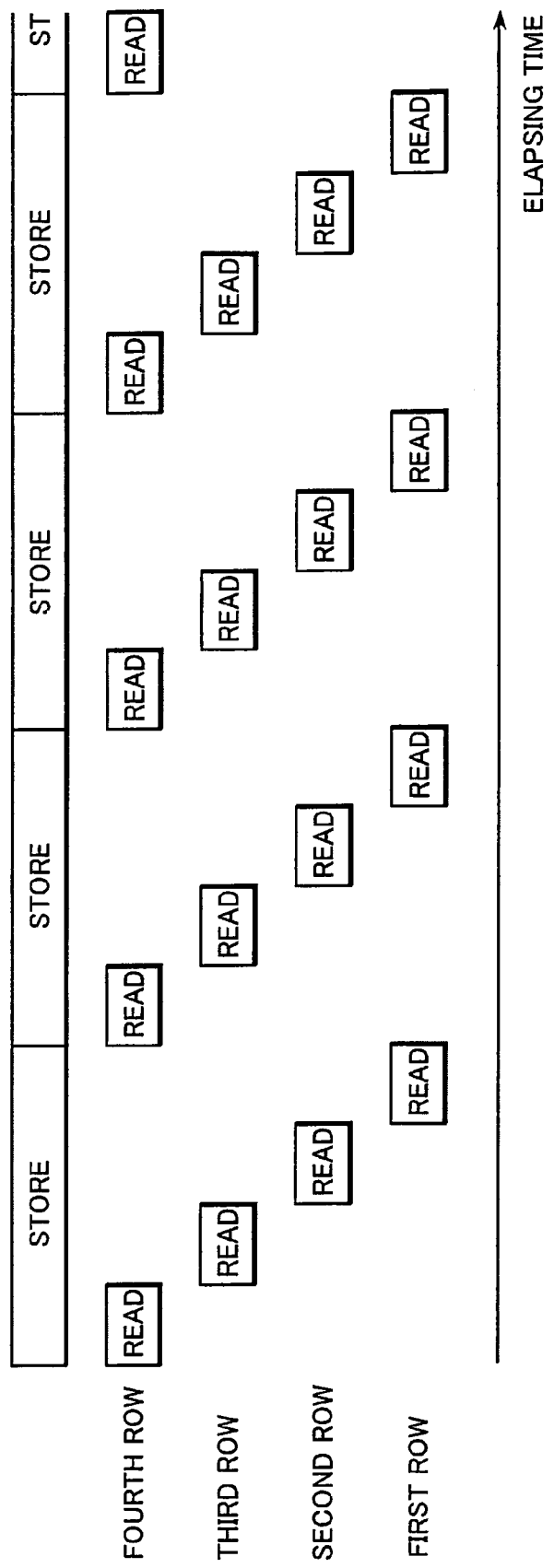
FIG. 32 shows the operational flow at the image sensor shown in FIG. 31 when it is engaged in cyclical operation.

FIG. 32 shows the operational flow of the cyclical operation executed in the image sensor shown in FIG. 31. The charge storage and the charge transfer to the vertical register 552 are executed simultaneously for all the pixels. Once the charges having been stored at the pixels are transferred to the vertical registers 552, next charge storage is enabled. The image signals are read out (output to the outside) in the order of; the fourth row, the third row, the second row and the first row, and this read operation is repeatedly executed over a specific cycle. The image data at the image-capturing pixels 310 thus read out are used for display to be brought up at the EVF. In addition, the image data at the focus detection pixels 312 and 313 are stored in the internal memory together with the image data having been read out through several past read operations, the image data corresponding to a specific number of recent read operations are added together so as to ensure that the level of the image data resulting from the addition processing is optimal for the focus detection calculation and focus detection calculation is executed based upon the image data sum.

Figure 33:
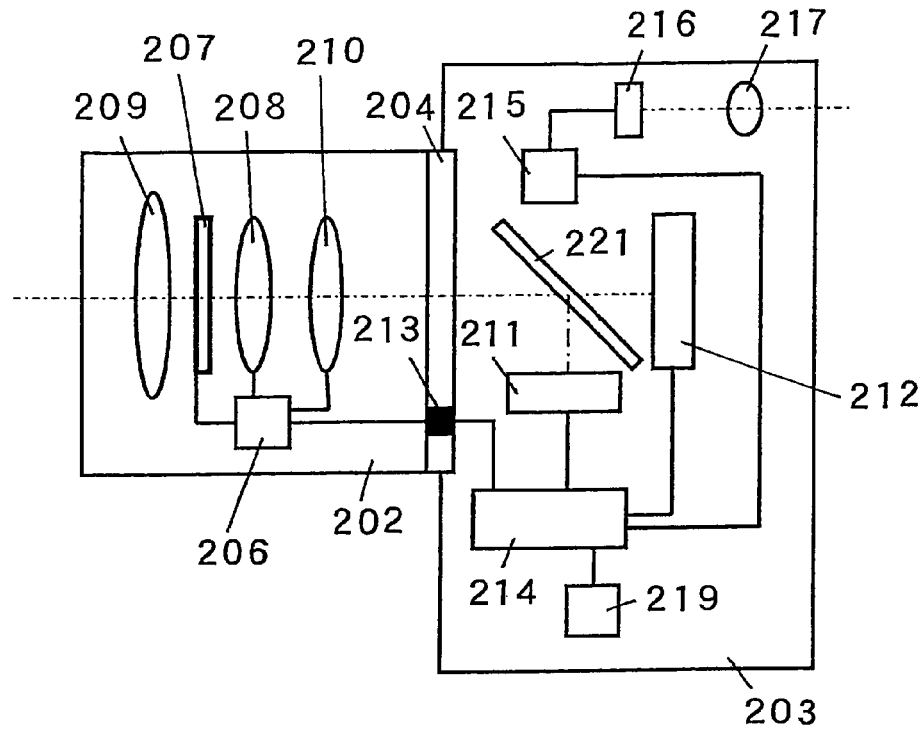
FIG. 33 shows the structure adopted in an image-capturing device in a variation.

FIG. 33 shows the structure adopted in an image-capturing device achieved in a variation. While the image sensor 211 is used both for focus detection and for image-capturing operation in the image-capturing device shown in FIG. 1, an image sensor 212 to be exclusively used for image-capturing operation may be installed as shown in FIG. 33. In such a case, the image sensor 211 according to the present invention may be utilized for focus detection and electronic viewfinder display alone. FIG. 33 shows a half mirror 221 at which a photographic light flux is split, mounted at the camera body 203. The image sensor 212 exclusively used for image-capturing operation is disposed on the transmission side, whereas the image sensor 211 utilized for focus detection and electronic viewfinder display is disposed on the reflection side. Prior to a photographing operation, focus detection and electronic viewfinder display are executed based upon the output from the image sensor 211. As the shutter is released, image data corresponding to the output from the image-capturing-exclusive image sensor 212 are generated.

Instead of the half mirror 221, a total reflection mirror may be used and in such a case, the mirror should be made to retreat from the photographic optical path during the photographing operation. In the image-capturing device adopting the structure, the image processing according to the present invention will be executed entirely for purposes of the electronic viewfinder display. It is to be noted that the positional arrangement assumed for the image sensor 211 and the image sensor 212 may be reversed, i.e., the image-capturing exclusive image sensor 212 may be disposed on the reflection side and the image sensor 211 utilized for focus detection and electronic viewfinder display may be disposed on the transmission side.

There is a conserve with regard to an image sensor constituted with a CMOS image sensor in that an error occurring in the charge storage timing with which electrical charges are stored at the focus detection pixels, inherent to the rolling shutter read method, may result in an error in the focus detection executed for a moving subject or in the focus detection executed while the image-capturing device is held by an unsteady hand. However, simultaneity of the charge storage at the focus detection pixels is assured in an image-capturing device with its image sensor constituted with a CCD image sensor, eliminating the type of focus detection error likely to occur in a CMOS image sensor.

While the image sensors in FIGS. 3 and 24 include the focus detection pixels disposed without allowing any interval in between in the focus detection area, the focus detection pixels may be set so as to occupy every few pixel positions. While the focus detection accuracy is somewhat lowered when the arraying pitch with which the focus detection pixels are disposed is increased, the quality of the image resulting from the interpolation processing is improved since the focus detection pixels 311 are set with a lower density.

While the image-capturing pixels in the image sensors shown in FIGS. 2 and 44 are equipped with color filters assuming a Bayer array, the color filters adopting a structure or an array other than that shown in the figures may be used in conjunction with the present invention. For instance, image-capturing pixels equipped with complementary color filters, i.e., G (green) filters, Ye (yellow) filters, Mg (magenta) filters and Cy (cyan) filters, may be used. At an image sensor constituted with image-capturing pixels equipped with these complementary color filters, the focus detection pixels should be disposed at pixel positions that would otherwise be occupied by image-capturing pixels equipped with cyan filters and magenta filters, (image-capturing pixels equipped with color filters that contain a blue component with which the output error is relatively unnoticeable).

While the focus detection pixels in the image sensors shown in FIGS. 3 and 24 are not equipped with color filters, the present invention may be adopted in conjunction with focus detection pixels equipped with color filters, the color (e.g., green) of which matches one of the colors of the color filters at the image-capturing pixels.

While the corrected image data are saved into the memory card 219 in the processing shown in the flowchart presented in FIG. 15, the corrected image data may be displayed at the electronic view finder or at a rear-side monitor screen disposed on the rear surface of the body.

While the image signals at all the image-capturing pixels in the image sensor are cyclically read out while the EVF display is up in the embodiment and the variations thereof described above, the image signals at only some of the image-capturing pixels may be read out through a culled (sub-sampling) read during the EVF display and the image signals at all the pixels may be read out only during the image-capturing operation instead.

The image-capturing device according to the present invention may be embodied as a device other than a digital still camera or a film still camera mounted with an exchangeable lens. The present invention may also be adopted in a digital still camera or a film still camera with an integrated lens. It may also be adopted in a compact camera module built into a portable telephone or the like, a surveillance camera or the like as well. The present invention may be further adopted in a focus detection device installed in a device other than a camera, a range-finding device or a stereo range-finding device.

The method adopted when adding the image signals at the focus detection pixels is not limited to that shown in FIG. 22. Since the ratio of the image signal level at the image-capturing pixels and the image signal level at the focus detection pixels at a given brightness level assumes a constant value in correspondence to the aperture value, the optimal number of addition operations to be executed to add up the image signals from the focus detection pixels can be determined based upon the levels of the image signals from the image-capturing pixels present around the focus detection pixels, which are read out over the specific cycle, and the aperture value.

As explained above, reliable focus detection is executed while assuring high-quality viewfinder image display in the embodiment. In addition, even when the subject brightness varies among individual focus detection areas, reliable focus detection can be executed in all the focus detection areas while assuring a high-quality viewfinder image display.

The above described embodiment is an example in various modifications can be made without departing from the scope of the invention.

LEGEND

10: micro-lens
11: photoelectric conversion portion
12: photoelectric conversion portion
13: photoelectric conversion portion
29: semiconductor circuit substrate
52: photoelectric conversion portion
53: photoelectric conversion portion
62: photoelectric conversion portion
63: photoelectric conversion portion
71: photoelectric conversion portion
72: focus detection light flux
73: focus detection light flux
81: -image-capturing light flux
82: focus detection light flux
83: focus detection light flux
90: exit pupil
91: optical axis
92: range
93: range
94: range
100: photographic image plane
101: focus detection area
102: focus detection area
103: focus detection area
104: focus detection area
105: focus detection area
106: focus detection area
201: digital still camera
202: exchangeable lens
203: camera body
204: mount unit
206: lens drive control device
207: aperture
208: zooming lens
209: lens
210: focusing lens
211: image sensor
212: image sensor
213: electrical contact point portion
214: body drive control device
215: liquid crystal display element drive circuit
216: liquid crystal display element
217: eyepiece lens
219: memory card
221: half mirror
310: image-capturing pixel
312: focus detection pixel
313: focus detection pixel
322: focus detection pixel
323: focus detection pixel
332: focus detection pixel
333: focus detection pixel
342: focus detection pixel
343: focus detection pixel
611: photoelectric conversion portion
612: photoelectric conversion portion
621: polarization filter
622: polarization filter
632: pixel
672: light flux
673: light flux
682: light flux
683: light flux
690: polarization holding frame
692: polarization filter
693: polarization filter

What is claimed is:

1. An image-capturing device, comprising:
a destructive read-type image sensor that executes photoelectric conversion of a light flux from an optical system at a plurality of pixels, stores electrical charges resulting from the photoelectric conversion respectively at the plurality of pixels, outputs a signal corresponding to each of the stored electrical charges at the plurality of pixels to be read out, and destroys the signal therein when the signal has been read out through a destructive read;
a read unit that reads out the signal from the image sensor over a specific cycle through the destructive read;
a display unit at which display is brought up based upon the signal read out through the destructive read by the read unit each time the read unit reads out the signal through the destructive read;
a storage unit that is located outside the destructive read-type image sensor and individually stores signals read out from a specific pixel of the plurality of pixels of the image sensor through the destructive read over plural read operations by the read unit, each signal in correspondence to a read operation;
an adding unit that is located outside the destructive read-type image sensor and adds up a plurality of signals obtained sequentially over time among the signals already read out from the specific pixel through the destructive read over the previous plural read operations and stored in the storage unit; and
a focus detection unit that detects a focus adjustment state of the optical system based upon adding results provided by the adding unit.

2. An image-capturing device according to claim 1, wherein:
the adding unit adjusts a number of signals to be added together so as to ensure that a signal level resulting from adding the signals exceeds a threshold value.

3. An image-capturing device according to claim 1, wherein:
the specific pixel includes a photoelectric conversion portion different from photoelectric conversion portions at pixels other than the specific pixel.

4. An image-capturing device according to claim 1, wherein:
the specific pixel assumes spectral characteristics different from spectral characteristics of pixels other than the specific pixel.

5. An image-capturing device according to claim 3, wherein:
the specific pixel is a focus detection pixel, based upon a signal from which a focus adjustment state of the optical system is detected; and
the image sensor includes a plurality of focus detection pixels disposed in an array in correspondence to a focus detection area set within an image plane formed via the optical system and pixels other than the focus detection pixels are disposed around the array of the focus detection pixels.

6. An image-capturing device according to claim 5, wherein:
the focus detection area is set at a plurality of positions within the image plane;
the image sensor includes a pixel row constituted with a plurality of focus detection pixels set in correspondence to each of the plurality of focus detection areas; and
the adding unit adds the signals individually in correspondence to each focus detection pixel row.

7. An image-capturing device according to claim 5, wherein:
the adding unit determines a number of signals from each focus detection pixel in the focus detection array to be added together in correspondence to signal levels at the other pixels disposed around the focus detection pixel array.

8. An image-capturing device according to claim 3, wherein:
the specific pixel at the image sensor receives light fluxes having passed through a pair of areas on an exit pupil of the optical system.

9. An image-capturing device according to claim 1, further comprising:
a control unit that executes control so as to store electrical charges at all the pixels in the image sensor over a uniform storage time.

10. An image-capturing device according to claim 1, wherein:
the destructive read-type image sensor includes image-capturing pixels used for displaying an image and focus detection pixels used for focus detection in a same image-capturing plane;
the image-capturing pixels and the focus detection pixels are arrayed two-dimensionally; and
each of the focus detection pixels corresponds to the specific pixel.

11. An image-capturing device according to claim 1, wherein:
the adding unit adds up the plurality of signals read out from the specific pixel most recently.

12. An image-capturing device according to claim 1, wherein:
the specific pixel is a focus detection pixel used for focus detection that includes a micro-lens and a photoelectric conversion portion and adopts a split-pupil-type phase difference detection method.

13. An image-capturing device, comprising:
a destructive read-type image sensor that executes photoelectric conversion of a light flux from an optical system at a plurality of pixels, stores electrical charges resulting from the photoelectric conversion respectively at the plurality of pixels, outputs a signal corresponding to each of the stored electrical charges at the plurality of pixels to be read out, and destroys the signal therein when the signal has been read out through a destructive read;
a read unit that reads out the signal from the image sensor over a specific cycle through the destructive read;
a display unit at which display is brought up based upon the signal read out through the destructive read by the read unit each time the read unit reads out the signal through the destructive read;
a storage unit that is located outside the destructive read-type image sensor and individually stores signals read out from a specific pixel of the plurality of pixels of the image sensor through the destructive read over plural read operations by the read unit, each signal in correspondence to a read operation;
an adding unit that is located outside the destructive read-type image sensor and adds up a plurality of signals obtained sequentially over time among the signals already read out from the specific pixel through the destructive read over the previous plural read operations and stored in the storage unit; and a focus detection unit that detects a focus adjustment state of the optical system based upon adding results provided by the adding unit, wherein:

the specific pixel includes a photoelectric conversion portion different from photoelectric conversion portions at pixels other than the specific pixel.

14. An image-capturing device, comprising:

a destructive read-type image sensor that executes photoelectric conversion of a light flux from an optical system at a plurality of pixels, stores electrical charges resulting from the photoelectric conversion respectively at the plurality of pixels, outputs a signal corresponding to each of the stored electrical charges at the plurality of pixels to be read out, and destroys the signal therein when the signal has been read out through a destructive read;

a read unit that reads out the signal from the image sensor over a specific cycle through the destructive read;

a display unit at which display is brought up based upon the signal read out through the destructive read by the read unit each time the read unit reads out the signal through the destructive read;

a storage unit that is located outside the destructive read-type image sensor and individually stores signals read out from a specific pixel of the plurality of pixels of the image sensor through the destructive read over plural read operations by the read unit, each signal in correspondence to a read operation;

an adding unit that is located outside the destructive read-type image sensor and adds up a plurality of signals obtained sequentially over time among the signals already read out from the specific pixel through the destructive read over the previous plural read operations and stored in the storage unit; and a focus detection unit that detects a focus adjustment state of the optical system based upon adding results provided by the adding unit, wherein:

the specific pixel is a focus detection pixel based upon a signal from which focus adjustment state of the optical system is detected; and the image sensor includes a plurality of focus detection pixels disposed in an array in correspondence to a focus detection area set within an image plane formed via the optical system and pixels other than the focus detection pixels are disposed around the array of the focus detection pixels.

15. An image-capturing device, comprising:

a destructive read-type image sensor that executes photoelectric conversion of a light flux from an optical system at a plurality of pixels, stores electrical charges resulting from the photoelectric conversion respectively at the plurality of pixels, outputs a signal corresponding to each of the stored electrical charges at the plurality of pixels to be read out, and destroys the signal therein when the signal has been read out through a destructive read;

a read unit that reads out the signal from the image sensor over a specific cycle through the destructive read;

a display unit at which display is brought up based upon the signal read out through the destructive read by the read unit each time the read unit reads out the signal through the destructive read;

a storage unit that is located outside the destructive read-type image sensor and individually stores signals read out from a specific pixel of the plurality of pixels of the image sensor through the destructive read over plural read operations by the read unit, each signal in correspondence to a read operation;

an adding unit that is located outside the destructive read-type image sensor and adds up a plurality of signals obtained sequentially over time among the signals already read out from the specific pixel through the destructive read over the previous plural read operations and stored in the storage unit; and a focus detection unit that detects a focus adjustment state of the optical system based upon adding results provided by the adding unit, wherein:

the specific pixel is a focus detection pixel, based upon a signal from which the focus adjustment state of the optical system is detected;

the image sensor includes a plurality of focus detection pixels disposed in an array in correspondence to a focus detection area set within an image plane formed via the optical system and pixels other than the focus detection pixels are disposed around the array of the focus detection pixels;

the focus detection area is set at a plurality of positions within the image plane;

the image sensor includes a pixel row constituted with a plurality of focus detection pixels, set in correspondence to each of the plurality of focus detection areas; and the adding unit adds the signals individually in correspondence to each focus detection pixel row.

16. An image-capturing device, comprising:

a destructive read-type image sensor that executes photoelectric conversion of a light flux from an optical system at a plurality of pixels, stores electrical charges resulting from the photoelectric conversion respectively at the plurality of pixels, outputs a signal corresponding to each of the stored electrical charges at the plurality of pixels to be read out, and destroys the signal therein when the signal has been read out through a destructive read;

a read unit that reads out the signal from the image sensor over a specific cycle through the destructive read;

a display unit at which display is brought up based upon the signal read out through the destructive read by the read unit each time the read unit reads out the signal through the destructive read;

a storage unit that is located outside the destructive read-type image sensor and individually stores signals read out from a specific pixel of the plurality of pixels of the image sensor through the destructive read over plural read operations by the read unit, each signal in correspondence to a read operation;

an adding unit that is located outside the destructive read-type image sensor and adds up a plurality of signals obtained sequentially over time among the signals already read out from the specific pixel through the destructive read over the previous plural read operations and stored in the storage unit; and a focus detection unit that detects a focus adjustment state of the optical system based upon adding results provided by the adding unit, wherein:

the specific pixel at the image sensor receives light fluxes having passed through a pair of areas on an exit pupil of the optical system.

* * * * *